(12) United States Patent
Asente et al.

(10) Patent No.: US 10,621,759 B2
(45) Date of Patent: Apr. 14, 2020

(54) BEAUTIFYING FREEFORM DRAWINGS USING TRANSFORMATION ADJUSTMENTS

(71) Applicant: ADOBE INC., San Jose, CA (US)

(72) Inventors: Paul John Asente, Redwood City, CA (US); Stephen Schiller, Oakland, CA (US); Jakub Fiser, Prague (CZ)

(73) Assignee: Adobe Inc., San Jose, CA (US)

( * ) Notice: Subject to any disclaimer, the term of this patent is extended or adjusted under 35 U.S.C. 154(b) by 30 days.

(21) Appl. No.: 15/962,269

(22) Filed: Apr. 25, 2018

(65) Prior Publication Data

US 2018/0247438 A1    Aug. 30, 2018

Related U.S. Application Data

(62) Division of application No. 15/138,037, filed on Apr. 25, 2016, now Pat. No. 9,984,481.

(51) Int. Cl.
| | |
|---|---|
| *G06T 11/20* | (2006.01) |
| *G06T 3/40* | (2006.01) |
| *G06T 3/60* | (2006.01) |
| *G06F 3/0484* | (2013.01) |
| *G06T 3/00* | (2006.01) |
| *G06F 3/0488* | (2013.01) |
| *G06T 7/12* | (2017.01) |

(52) U.S. Cl.
CPC ........ *G06T 11/203* (2013.01); *G06F 3/04842* (2013.01); *G06F 3/04845* (2013.01); *G06F 3/04883* (2013.01); *G06T 3/0006* (2013.01); *G06T 3/0081* (2013.01); *G06T 3/40* (2013.01); *G06T 3/60* (2013.01); *G06T 7/12* (2017.01); *G06T 2200/24* (2013.01)

(58) Field of Classification Search
None
See application file for complete search history.

(56) References Cited

U.S. PATENT DOCUMENTS

| 2005/0022207 A1 | 1/2005 | Grabarnik |
| 2006/0227140 A1 | 10/2006 | Ramani et al. |
| 2011/0038543 A1* | 2/2011 | Bhattacharyya ... G06K 9/00422 382/187 |

OTHER PUBLICATIONS

Igarashi T, Matsuoka S, Kawachiya S, Tanaka H. Interactive beautification: A technique for rapid geometric design. In: Proceedings of ACM Symposium on User Interface Software and Technology. 1997, p. 105-14.

(Continued)

*Primary Examiner* — Yanna Wu
(74) *Attorney, Agent, or Firm* — Shook, Hardy & Bacon, L.L.P.

(57) ABSTRACT

Embodiments of the present invention are directed to beautifying freeform input paths in accordance with paths existing in the drawing (i.e., resolved paths). In some embodiments of the present invention, freeform input paths of a curved format can be modified or replaced to more precisely illustrate a path desired by a user. As such, a user can provide a freeform input path that resembles a path of interest by the user, but is not as precise as desired. Based on existing paths in the electronic drawing, a path suggestion(s) can be generated to rectify, modify, or replace the input path with a more precise path. In some cases, a user can then select a desired path suggestion, and the selected path then replaces the initially provided freeform input path.

20 Claims, 15 Drawing Sheets

(56) References Cited

OTHER PUBLICATIONS

Pavlidis T, Van Wyk CJ. An automatic beautifier for drawings and illustrations. ACM SIGGRAPH Computer Graphics 1985;19(3)225-34.

Igarashi T, Hughes JF. A suggestive interface for 3d drawing. In: Proceedings of ACM Symposium on User Interface Software and Technology. 2001, p. 173-81.

Plimmer B, Grundy J. Beautifying sketching-based design tool content: Issues and experiences. In: Proceedings of Australasian Conference on User Interface. 2005, p. 31-8.

Wang B, Sun J, Plimmer B. Exploring sketch beautification techniques. In: Proceedings of ACM SIGCHI New Zealand Chapter's International Conference on Computer-human Interaction: Making CHI Natural. 2005, p. 15-6.

Zeleznik R, Bragdon A, chi Liu C, Forsberg A. Lineogrammer: Creating diagrams by drawing. In: Proceedings of ACM Symposium on User Interface Software and Technology. 2008, p. 161-70.

LaViola Jr. JJ, Zeleznik RC. Mathpad2: A system for the creation and exploration of mathematical sketches. ACM Transactions on Graphics 2004; 23(3):432-40.

Paulson B, Hammond T. Paleosketch: Accurate primitive sketch recognition and beautification. In: Proceedings of International Conference on Intelligent User Interfaces. 2008, p. 1-10.

Murugappan S, Sellamani S, Ramani K. Towards beautification of freehand sketches using suggestions. In: Proceedings of Eurographics Symposium on Sketch-Based Interfaces and Modeling. 2009, p. 69-76.

Cheema S, Gulwani S, LaViola J. Quickdraw: Improving drawing experience for geometric diagrams. In: Proceedings of SIGCHI Conference on Human Factors in Computing Systems. 2012, p. 1037-64.

Baran I, Lehtinen J, Popovic J. Sketching clothoid splines using shortest paths. Computer Graphics Forum 2010;29 (2):655-64.

Orbay G, Kara LB. Beautification of design sketches using trainable stroke clustering and curve fitting. IEEE Transactions on Visualization and Computer Graphics 2011;17(5):694-708.

Lee YJ, Zitnick CL, Cohen MF. Shadowdraw: real-time user guidance for freehand drawing. ACM Transactions on Graphics 2011;30(4):27.

Zitnick CL. Handwriting beautification using token means. ACM Transactions on Graphics 2013; 32(4):8.

Noris G, Hornung A, Sumner RW, Simmons M, Gross M. Topology driven vectorization of clean line drawings. ACM Transactions on Graphics 2013; 32(1):11.

Su Q, Li WHA, Wang J, Fu H. Ez-sketching: Three-level optimization for error-tolerant image tracing. ACM Transactions on Graphics 2014; 33(4):9.

Fiser J, Asente P, Sykora D. Shipshape: A drawing beautification assistant. In: Sketch-Based Interfaces and Modeling. 2015, p. 9.

Eiter T, Mannila H. Computing discrete Frechet distance. Tech. Rep.; Technische Universitat Wien; 1994.

Ramer U. An iterative procedure for the polygonal approximation of plane curves. Computer Graphics and Image Processing 1972;1(3):244-56.

Douglas DD, Peucker KT. Algorithms for the reduction of the number of points required to represent a digitized line or its caricature. Cartographica: The International Journal for Geographic Information and Geovisualization 1973;10(2):112-22.

Igarashi,"Pegasus: A Drawing System for Rapid Geometric Design", In Proceedings: CHI'98 Conference Summary on Human Factors in Computing Systems, 1998, 2 pages.

Fiser et al., Advanced drawing beautification with ShipShape, Computers & Graphics, vol. 56, May 2016, pp. 46-58. Available at: http://www.sciencedirect.com/science/article/pii/S0097849316300127.

Murugappan, S., & Ramani, K. (Jan. 2009). Feasy: a sketch-based interface integrating structural analysis in early design. In ASME 2009 International Design Engineering Technical Conferences and Computers and Information in Engineering Conference (pp. 743-752). American Society of Mechanical Engineers.

Kara et al. "An Image-based, trainable symbol recognizer for hand-drawn sketches" Computers & Graphics 29 (2005) 501-517.

Zhang, X., Song, J., Dai, G., & Lyu, M. R. (2006). Extraction of line segments and circular arcs from freehand strokes based on segmental homogeneity features. IEEE Transactions on Systems, Man, and Cybernetics, Part B (Cybernetics), 36(2), 300-311.

First Action Interview Pilot Program Pre-Interview Communication dated Mar. 6, 2020 in U.S. Appl. No. 16/752,902. 4 pages.

* cited by examiner

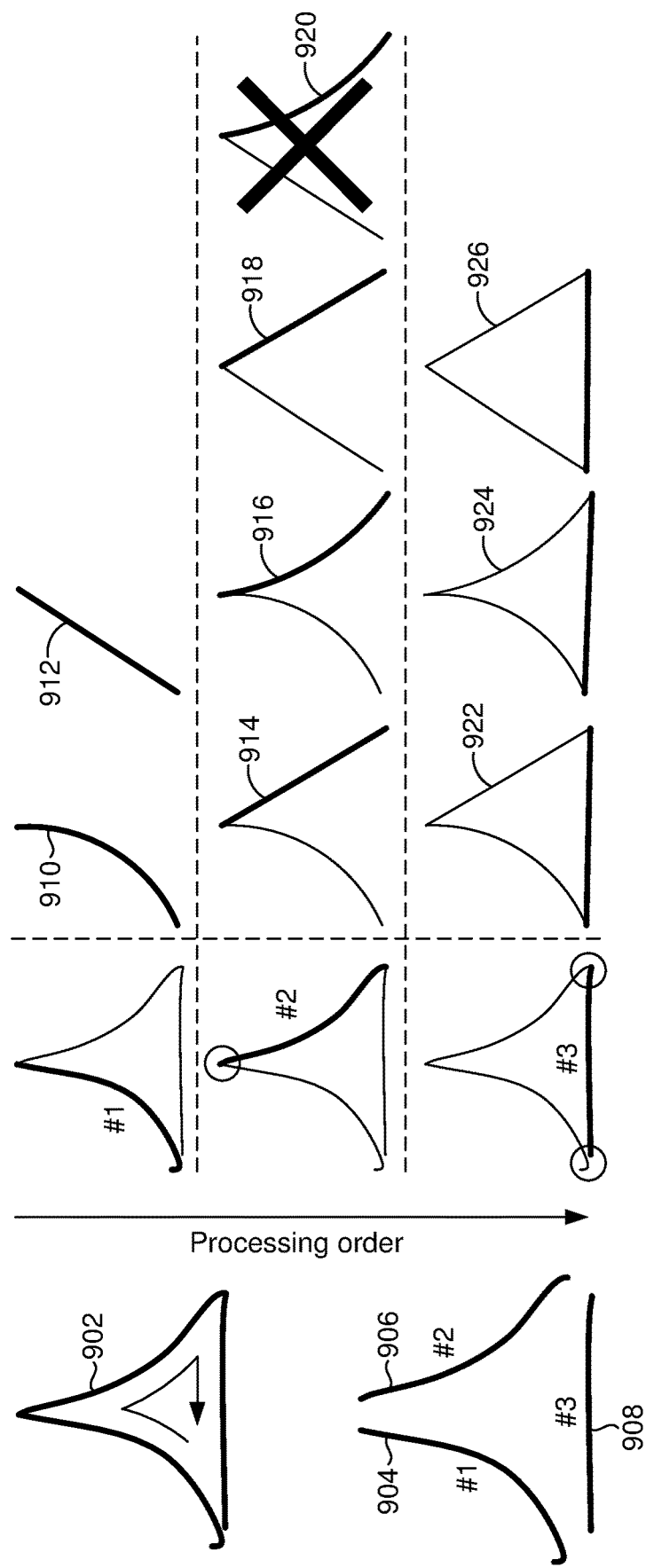

BEAUTIFYING FREEFORM DRAWINGS USING TRANSFORMATION ADJUSTMENTS

CROSS REFERENCE TO RELATED APPLICATIONS

This application is a divisional of U.S. patent application Ser. No. 15/138,037, filed Apr. 25, 2016, and entitled "BEAUTIFYING FREEFORM DRAWINGS." The entirety of the aforementioned application is incorporated by reference herein.

BACKGROUND

Freeform drawings provide a simple way for users to create content to graphically represent an image, idea or principle. Freeform drawings are also referred to as electronic sketches, and are generally unconstrained inputs that are specified using freeform paths to mimic a user's ability to draw on a piece of paper using a pen or pencil. In computing devices, a user may define freeform paths that are detected using touchscreen functionality of a display device (e.g., as a gesture, through use of a stylus), using a cursor control device, and so on.

Although a user may quickly input freeform paths to compose a drawing, the freeform paths are typically informal and thus not intended as a finished work. Conventional techniques have been developed to increase precision and the look-and-feel of these freeform drawings. These conventional techniques, however, typically require detailed knowledge on the part of a user and involve a significant amount of time to perform.

SUMMARY

Aspects of the present disclosure relate to beautifying freeform input paths in accordance with paths existing in the drawing (i.e., resolved paths). In this regard, freeform input paths of a curved format can be modified or replaced to more precisely illustrate a path desired by a user. As such, a user can provide a freeform input path that resembles a path of interest by the user, but is not as precise as desired. Based on existing paths in the electronic drawing, a path suggestion(s) can be generated to rectify, modify, or replace the input path with a more precise path. In some cases, a user can then select a desired path suggestion, and the selected path then replaces the initially provided freeform input path.

To generate path suggestions for curved input paths, embodiments of the present invention describe various analytics and rules that can be applied to beautify a curved input path. In particular, upon obtaining an input path, the input path can be analyzed in accordance with one or more resolved paths (paths previously existing in the drawing) to generate path suggestions. Examples of such rules that provide path suggestions for curved input paths include arc and circle center snapping, path transformation, and transformation adjustment. Further, to enhance path suggestions for curved input paths, in some implementations, a curved input path can be divided into segments based on detected corners within the curved input path. Each segment can then be assessed using beautification rules in light of prior assessed segments and/or resolved paths to generate path suggestions associated with that particular segment and/or the entire curved input path.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 9 illustrates an example of multi-segment path processing according to embodiments of the present disclosure;

DETAILED DESCRIPTION

Figure 1:
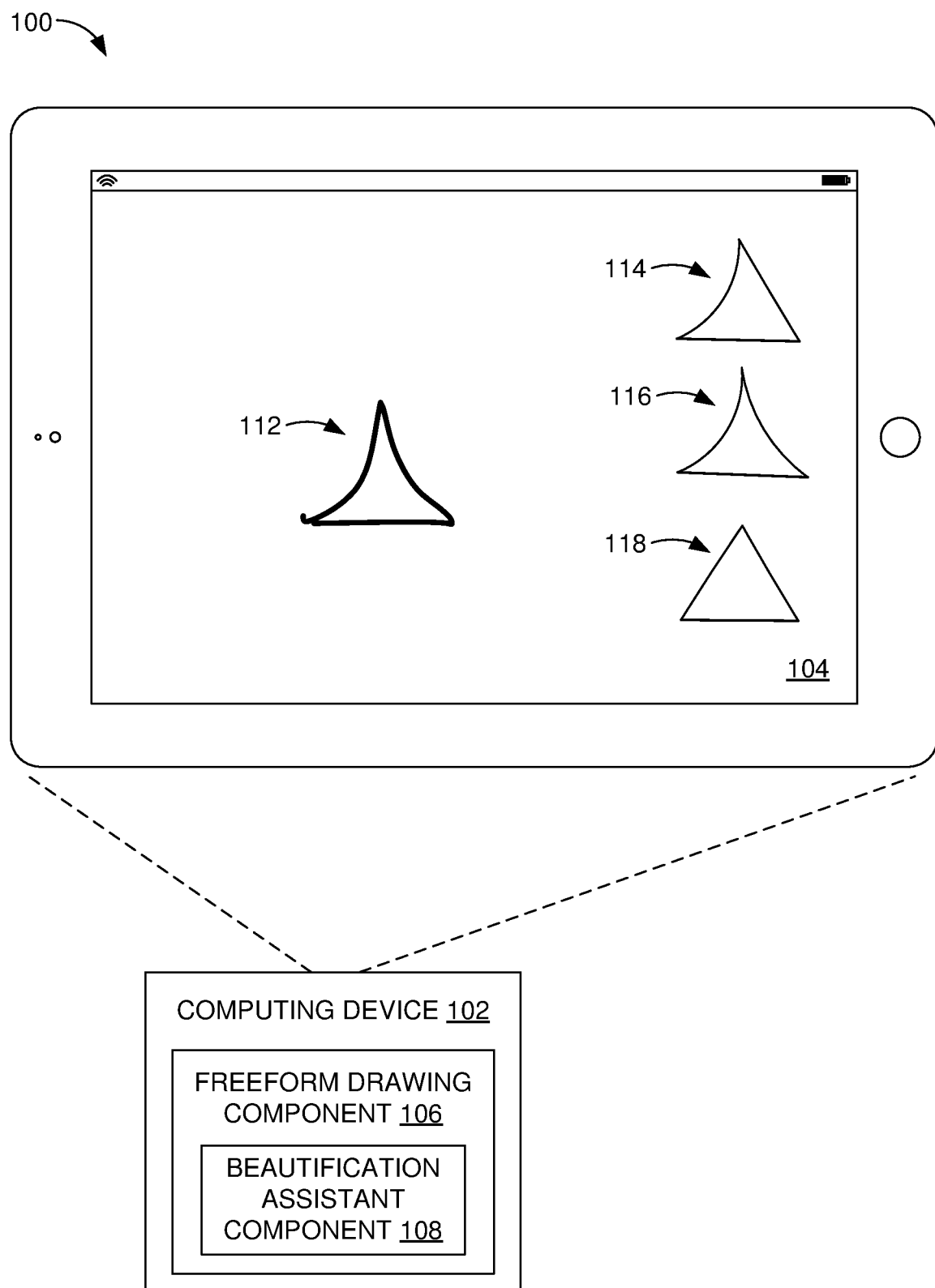
FIG. 1 is an illustration of an environment in an example implementation that is operable to employ freeform drawing beautification techniques described herein.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Freeform drawings, such as electronic sketches, are one of the simplest ways to visualize ideas. One key advantage is that the user is not required to have specialized knowledge of particular drawing software nor any advanced drawing skills. In practice, however, these skills may become necessary to improve the visual fidelity of the resulting drawing. Conventional techniques used to make the freeform input look more precise and polish generally require the user to have experience with drawing software. Even if the user has this experience, use of conventional drawing software could take even longer to perform than making the freeform input itself.

Further, many of such conventional techniques visually improve only straight line segments and utilize a set of basic rules to make such freeform input look more precise. Users, however, typically provide freeform input in the form of straight line segments as well as curved segments. As with making straight line freeform input look more precise, users often desire input strokes in the form of arbitrarily curved paths to also look more precise. Although some conventional implementations can recognize a curve, other existing paths are not taken into consideration to visually improve curve segments such that the curved segments appear more precise. Contemplation of other existing paths in association with an input path can enable a more interactive design for the user and provide a more precise curved path in the drawing.

Accordingly, embodiments of the present invention are directed to beautifying curved input paths in accordance with paths existing in the drawing (i.e., resolved paths). In particular, input paths of a curved format can be modified or replaced to more precisely illustrate a path desired by a user. As such, a user can provide a freeform input path that resembles a path of interest by the user, but is not as precise as desired. Based on existing paths in the electronic drawing, however, one or more path suggestions can be provided to rectify, modify, or replace the input path with a more precise path.

To generate path suggestions for curved input paths, embodiments of the present invention describe various analytics and rules that can be applied to beautify a curved input path. In particular, upon obtaining an input path, the input path can be analyzed in accordance with one or more resolved paths (paths previously existing in the drawing) to generate path suggestions.

One example used to beautify an input path is an arc and circle center snapping rule. An arc and circle center snapping rule is generally used to align a center point of an input arc or circle with a point of a resolved path. For example, a center point associated with an arc or circle might be aligned with an endpoint of another path, a center associated with another arc or circle path, a center of rotation associated with another path, a center of a polygon associated with a resolved path (e.g., polygons composed from series of line segments), etc. To align a center point of an arc or circle with a resolved path point, an adaptive distance between an input center and potential resolved path points can be evaluated. When the input center point is within an adaptive distance of a resolved path point, the input center point might be snapped or aligned with the resolved path point and the radius of the arc or circle can be adjusted. Such an adaptive search radius can be beneficial to effectively capture a user's intent. For example, arcs with small angular spans are difficult to draw precisely without a guide (e.g., users tend to draw the arc too curved). As such, the identified center of the input arc might be positioned at a distance too far apart from a desired center point. As such, adaptive expansion of the search radius increases the likelihood that an imprecise input will provide the user the expected, precise output.

Other examples used to beautify an input path include a path transformation rule and a transformation adjustment rule. A path transformation rule is generally used to generate a path suggestion(s) that is a transformation of a resolved path that is sufficiently similar to an input path. As such, upon detecting that an input path is sufficiently similar to a resolved path, for example, using an affine similarity transformation matrix, the resolved path can be transformed (e.g., using the affine similarity transformation matrix) and provided as a path suggestion.

Further, as can be appreciated, in some cases, the transformed resolved path can be adjusted to result in a more precise path suggestion. For example, assume that a transformed resolved path has a rotation of 43 degrees. In such a case, as the user may have desired to rotate the path 45 degrees, an adjusted transformation can be applied such that the path suggestion is rotated 45 degrees. At a high-level, and as described in more detail below, to determine an adjusted transformation, the transformed resolved path can be separated into components, such as a rotation, scale, and translation component. The various components can be compared to target components and, if within a threshold of similarity, the component value can be adjusted to the target component value. For instance, when the rotation component of a transformed resolved path is 43 degrees and a target component value is 45 degrees, upon determining that 43 degrees is sufficiently similar to 45 degrees, a path suggestion can be provided with a 45 degree transformation.

In some implementations, beautifying curved input paths in accordance with paths existing in the drawing (i.e., resolved paths) is performed using multi-segment path processing. Multi-segment path processing enables a single input path to be divided into segments that are separately analyzed in light of prior assessed segments and/or resolved paths. In particular, a curved input path can be segmented based on detection of corners within the curved input path. The segments can then be processed sequentially to generate one or more path suggestions using beautification rules (e.g., arc and circle center snapping rule, path transformation rule, a transformation adjustment rule, etc.) in light of previously analyzed segments and/or resolved paths. In some cases, to reduce the number of path suggestions, the number of path suggestions can be limited for each processed segment.

Although aspects of the present invention are generally described herein in relation to curved input paths, as can be appreciate, this technology can be implemented in relation to other input paths. The above concepts and others, including variations and combinations thereof, are contemplated as being within the scope of the present disclosure.

Turning now to FIG. 1, a block diagram is provided showing an example of an operating environment in which some implementations of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location.

Various functions described herein as being performed by one or more entities may be carried out by hardware, firmware, and/or software. For instance, some functions may be carried out by a processor executing instructions stored in memory.

FIG. 1 is an illustration of an environment 100 in an example implementation that is operable to employ freeform drawing beautification techniques described herein. The illustrated environment 100 includes computing device 102 having a display device 104 on which a user interface may be displayed to support user interaction. The computing device 102 may be configured in a variety of ways. The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud."

The computing device 102 is illustrated as including a freeform drawing component 106. The freeform drawing component 106 is representative of functionality of the computer device 102 to accept and process user inputs to form freeform drawings for display by the display device 104. A user, for example, may provide inputs using a cursor control device, gesture, stylus, and so on to define a freeform drawing for output. The freeform drawing component 106 is also illustrated as including a beautification assistant component 108 that is representative of functionality to rectify a freeform drawing input by a user in a manner that maintains simplicity and speed of freeform sketching while still taking into account geometric relations.

At a high level, beautification assistant component 108 rectifies a freeform drawing input by a user, such as input 112. Based on the user input 112, suggested drawings 114, 116, and 118 can be generated and provided to the user. Assume that the user desires the original freeform input to transform to suggested drawing 116. In such a case, the user can select suggested drawing 116 to replace the original freeform input with the suggested drawing 116.

Figure 2:
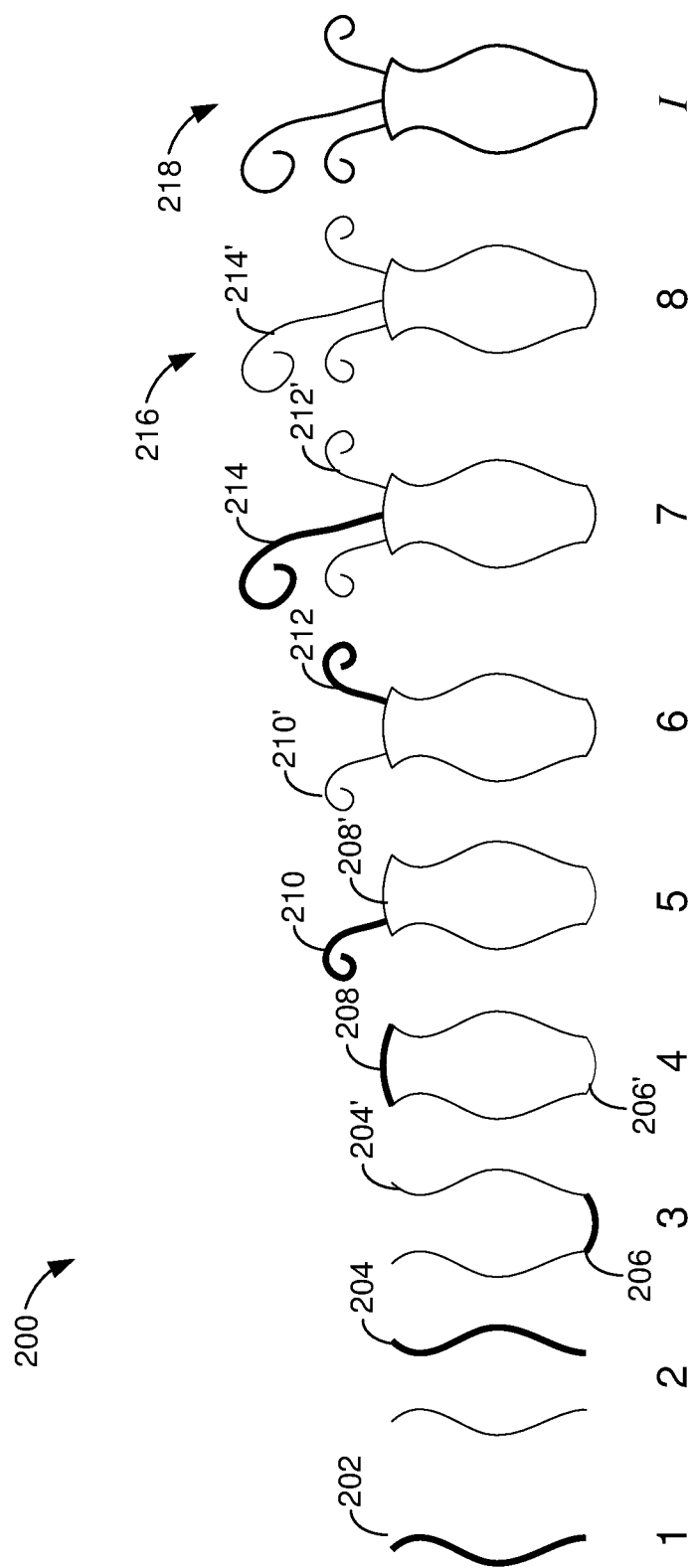
FIG. 2 depicts an example of a beautification workflow of a beautification assistant component, in accordance with embodiments of the present invention.

FIG. 2 depicts an example 200 of a beautification workflow of the beautification assistant component 108 of FIG. 1. Incremental beautification performed by the beautification assistant component 108 is shown as successive input lines 202-214 and adjusted lines 204'-214' through stages 1-7 to arrive at a beautification result 216, as contrasted with drawn collection 218 of input lines 202-214.

For example, a user initially draws input line 202, which remains as is because there are no other lines that serve as a basis for adjustment. Input line 204 is then drawn, which is adjusted by the beautification assistance component 108 to form adjusted line 204' to form a mirror image of the input line 202 through a process referred to as reflection. Input line 206 is then drawn by a user, which is then adjusted by the beautification assistant component 108 to have a symmetric curve as shown for adjusted line 206' through arc fitting. Similarly, input line 208 is drawn by a user and adjusted by the beautification assistant component 108 to have a symmetric curve as shown for adjusted line 208'.

An input line 210 is then drawn to represent a plant leaf, which is sufficiently different from other lines and, as such, is not adjusted. Curve identity, reflection, and scaling are then used to adjust subsequent input lines 212, 214 to form adjusted lines 212', 214' that are based at least in part on adjusted line 210' and, as such, mimic characteristics of the plant leaf. Thus, as the freeform drawing continues, more suitable geometric constraints emerge and are applied by the beautification assistant component 108 as suggestions, such as curve identity (e.g., stages 2, 6, 7), reflection (e.g., stages 2 and 6), and arc fitting (stages 3, 4). Thus, as is readily apparent through comparison with the input 218 and final output freeform art at the result 216, the beautification assistant component 108 supports efficient freeform drawing with results that are ready for sharing with others.

Figure 3:
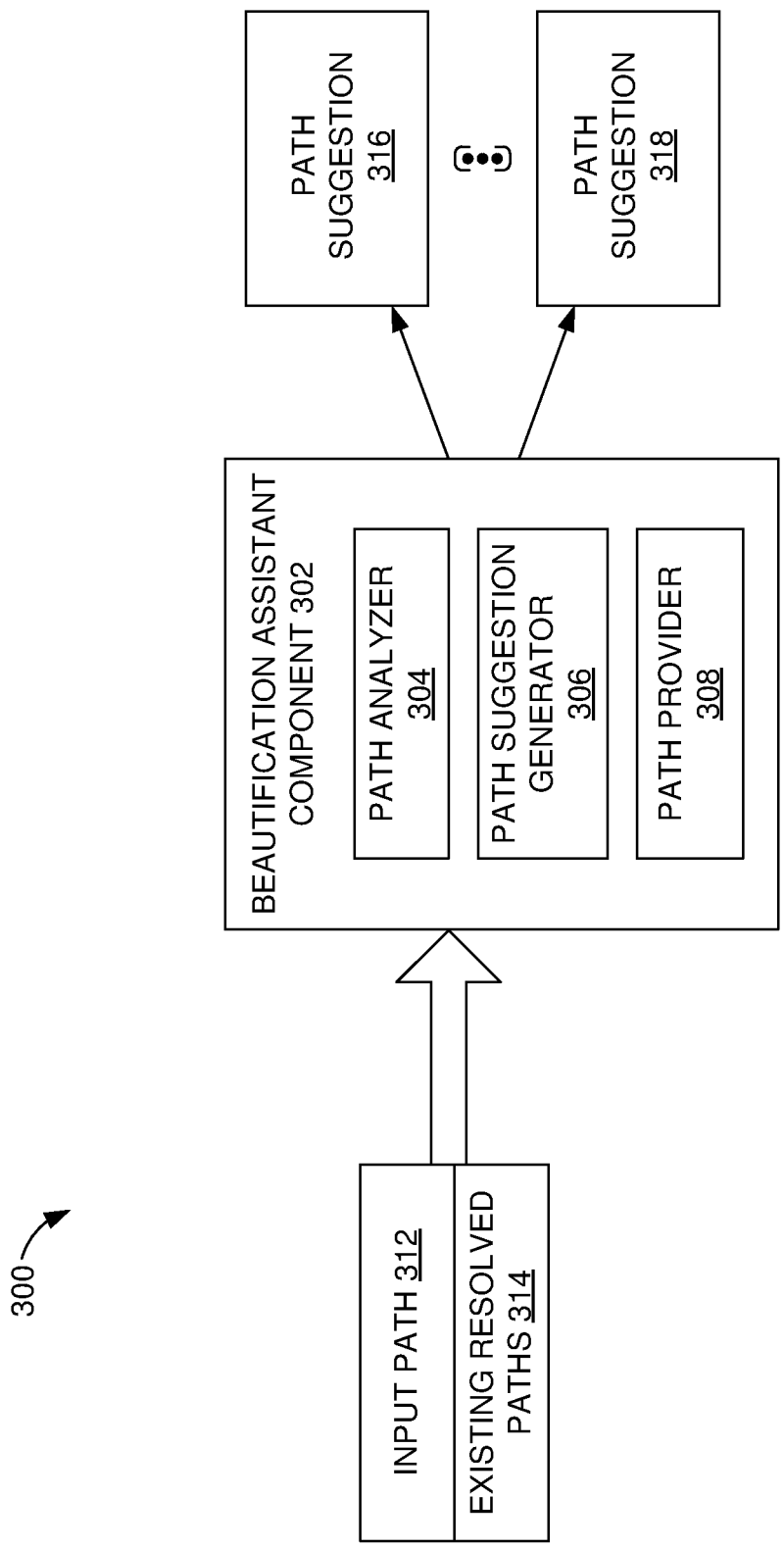
FIG. 3 depicts an implementation of a beautification assistant component, in accordance with embodiments of the present invention.

FIG. 3 depicts an implementation of a beautification assistant component used to facilitate beautifying curved input paths in accordance with paths existing in the drawing (i.e., resolved paths). As shown in FIG. 3, the beautification assistant component 302 can include a path analyzer 304, a path suggestion generator 306, and a path provider 308. As shown in FIG. 3, the input to the beautification assistant component 302 includes an input path 312 and a set of one or more existing resolved paths 314. An input path refers to a path or stroke that is currently or most recently provided by a user (e.g., via contact with a touch display, a mouse, etc.). An input path may be of any shape or size. For instance, as described herein, an input path may be a line segment or path, or a curved segment or path. A curved segment or path generally refers to any path with a curve, such as an arc, a circle, a spiral, a general cubic Bezier curve, or any type of curve path. In this regard, a curved path gradually deviates from being straight for some or all of its length. A resolved path refers to a path previously input by a user (prior to an input path). A resolved path is generally established as an aspect of the drawing, or a path that has become fixed in the drawing. For example, a resolved path may be a previously provided freestyle path or a previously provided freestyle path that has been converted to or replaced with a beautified or modified path.

Paths or strokes, such as input path 312, can be input in any number of manners. For instance, in some implementations, a user may use a touch input to provide a path or stroke to the computing device. In other implementations, a user might use a mouse, a digital pen, or other component to input freeform paths to the computing device.

Input path 312 and resolved path(s) 314 can be received, retrieved, referenced, or otherwise accessed at any time. For example, in accordance with recognizing that a user has completed an input path, such as input path 312, data associated with the input path (input path data) and a group of resolved paths (resolved path data) can be obtained. In some cases, data for each of the resolved paths associated with the drawing might be obtained. In other cases, data for a particular set of the resolved paths associated with the drawing might be obtained. For instance, resolved paths positioned near or proximate to the input path might be referenced, resolved paths input at a time near or proximate to the time of the input path might be referenced, etc.

Upon obtaining path data, such as input path data and resolved path data, the path analyzer 304 can utilize path data to analyze input paths and/or resolved paths. Path data generally refers to any data indicating a path or stroke associated with an input path or a resolved path. For instance, path data may represent position or placement of a curved path on a drawing canvas. As another example, path data may represent a sequence of cubic Bezier curves. Although analysis of path data is generally described herein with reference to input paths and resolved paths, as can be appreciated, in some cases, the resolved paths may have been previously analyzed and such analysis data stored in a data store for reference. Using analysis from previously resolved and analyzed paths can reduce computation performed by a computing device.

In some implementations, the path analyzer 304 can analyze paths by performing corner detection, path sampling, and/or path matching. Corner detection, path sampling, and/or path matching may be performed to analyze paths (e.g., input paths) such that one or more path suggestions can be generated. As can be appreciated, in implementation, the path analyzer 304 may only perform a portion or none of corner detection, path sampling, and/or path matching, or may perform other or additional analyses of paths. For instance, depending on a particular implementation, or a particular input stroke, only path sampling and path matching may be performed.

Corner detection generally refers to analysis of a path (e.g., a freeform input path) to detect one or more corners in the path. Corner detection can be performed so that a path with multiple segments (e.g., parts of an unprocessed user input) can be processed as a whole and/or individually. In this regard, an entire input path with multiple segments, defined or split by corner features, can be analyzed to provide a path suggestion(s). Alternatively or additionally, segments defined or split by corner features of an input path can be individually processed to provide suggestion paths. By way of example, assume that a single input stroke is drawn generally in the shape of a triangle. For instance, a user may draw a triangle by way of touch input without lifting her or his finger from the touch screen until the triangle is completed, or mostly completed. In such a case, corners of the triangle can be detected to generate multiple segments for processing or evaluating. As such, once divided into segments, the path suggestion generator 306 can utilize the segments using one or more rules to generate path suggestions for the input path, as described in more detail below.

Corner detection can be applied in any manner. By way of example only, an input path drawn by a user (e.g., converted to a sequence of cubic Bezier curves) can be assessed to identify curves in the path. Identified curves can be sampled to generate sample points along the path. For example, in one implementation, a curve can be sampled with a small step size (e.g., 2 view-space pixels). In accordance with identifying sample points, a tangent vector may be calculated at each sample point, e.g., along the curve. Using successive samples, an angular turn can be calculated. For instance, using a sliding window of three successive samples, an angular turn value can be calculated at each sample position except the first and last sample point. The greatest angular turn value among the sample points of the curve may be identified or designated as a point at which to break or segment the original input sequence. Such a method can be performed at any number of identified curves (e.g., each identified curve) to generate any number of segments from a single input path. In some cases, to remove outliers, such as unwanted "hooks" at the end(s) of the input path, a segment having a length that is small in comparison to the rest of the segments can be discarded. By way of example only, a segment having a length that is less than 15% of the length-wise closest other segment can be discarded.

Path sampling generally refers to identifying points on a path as sample points for use in analyzing the path. As can be appreciated, analyzing cubic Bezier curves may be difficult. As such, in some implementations, operations may be performed on sampled paths, that is, paths of sample points. Path sampling may be performed for input paths and resolved paths. As can be appreciated, as resolved paths are established, in some cases, path sampling for resolved paths can be precomputed and stored.

Figure 4:
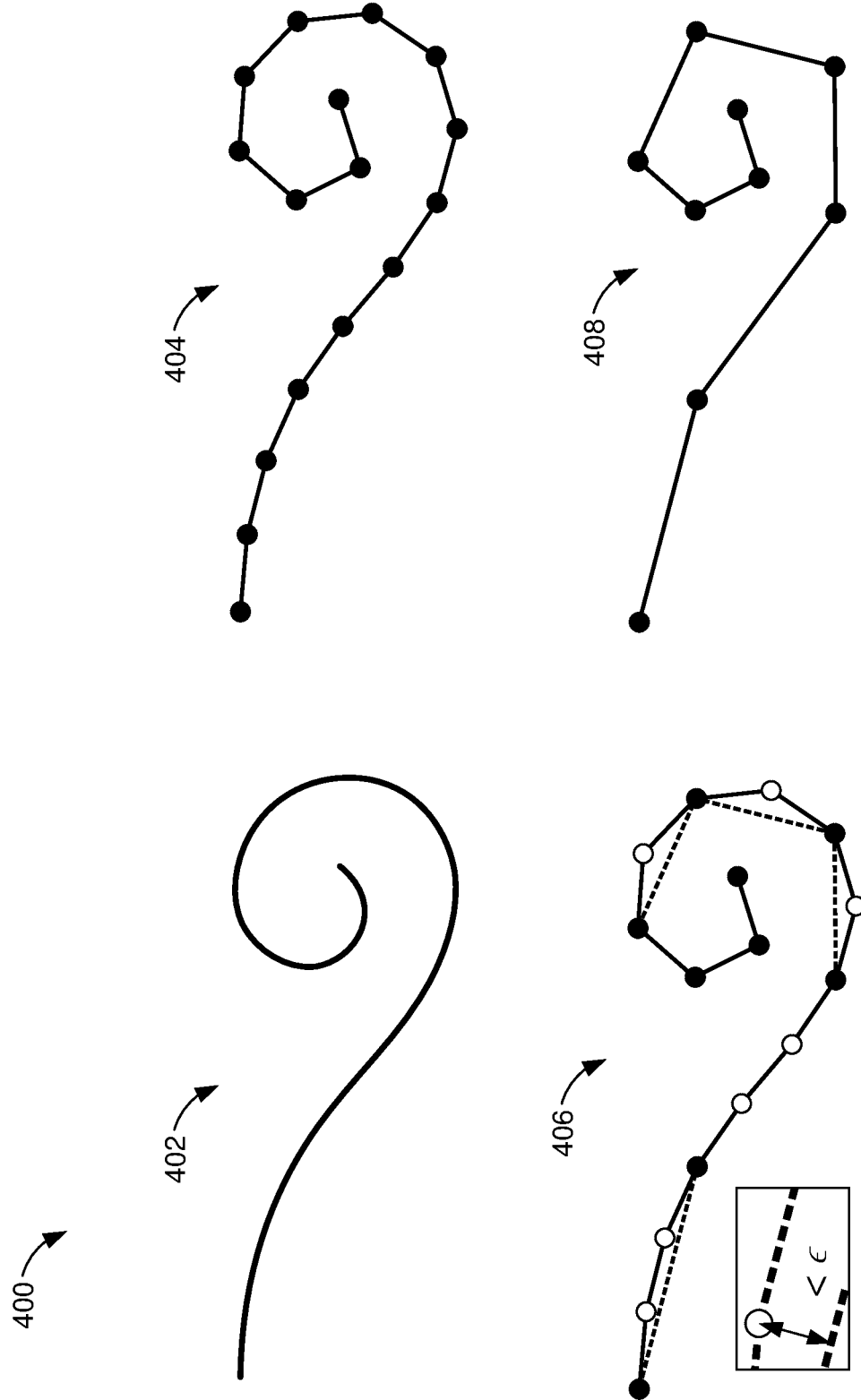
FIG. 4 depicts an example of reduction of memory and computation complexity using path sampling, according to embodiments of the present invention.

Further, in some cases, to reduce the memory requirement and computational complexity of different path comparisons, path sampling can be simplified, for instance, using the Ramer-Douglas-Peucker algorithm. To this end, for a polyline p, the Ramer-Douglas-Peucker algorithm can identify a reduced version (path sample) p' with fewer points within a given tolerance E, that is, points of p' lie within the distance $\in$ (e.g., $\in$=4 view-space pixels) of the original input path. By way of example, and with reference to FIG. 4, an original Bezier path 402 is equidistantly sampled, giving a polyline 404. The Ramer-Douglas-Peucker algorithm then recursively simplifies the polyline by omitting points closer than "$\in$" to the current approximation as shown at example 406, finally constructing a simplified polyline 408. In an example implementation, "$\in$=4" view-space pixels at the time the path was drawn is used for path sampling. View-space pixels may be used to result in distance measurements that are magnification independent.

Path matching refers to determining or identifying whether one path matches another. In particular, a determination can be made as to whether an input path matches or corresponds with a resolved path. A path may match or correspond with another path if the paths are generally classified as the same shape or are different instances of the same template. For example, a path can be identified as matching if it is the same shape, but a different size, or rotated.

At a high-level, to detect that two paths match, paths can be aligned and, thereafter, evaluated for similarity between the two paths. To align paths, affine similarity transform can be used. Affine similarity transfer refers to a composition of a rotation, scale, and/or translation. Generally, with affine similarity transfer, the shape is not changed or skewed. To align paths, an affine similarity matrix that transforms one path (e.g., resolved path) to another path (e.g., an input path) as closely as possible can be identified or determined. An affine similarity matrix M may be represented as follows:

$$\begin{bmatrix} s\cos & -s\sin & 0 \\ s\sin & s\cos & 0 \\ tx & ty & 1 \end{bmatrix}$$

wherein s cos=s*cos θ, s sin=s*sin θ, θ represents the rotation angle, s represents the scale, and (tx, ty) represents the translation.

In some cases, to compute an affine similarity transformation matrix M that transforms one path to another, two equal length lists of points, each including N equally-spaced samples (e.g., 10 points) from the resolved path and the input path, can be used. For instance, assume that $\{P_i\}$ are the points from the resolved path, and $\{Q_i\}$ are the points from the input path, the matrix M that minimizes the sum of squared distances E can be determined as follows:

$$E = \Sigma_{i=1}^{N} \|P_i * M - Q_i\|^2 \qquad \text{Equation 1}$$

Such a quadratic function of variables s cos, s sin, tx, and ty can be solved as a least-squares problem over such variables. In particular, this enables selection of a matrix M so that the matrix M multiplied by the resolved path P results in the best match to the input path Q.

As can be appreciated, an affine similarity transformation matrix M can be identified for any number of input-resolved path pairs. For example, an affine similarity transformation matrix M might be determined for each resolved path with respect to an input path. To this end, if five resolved paths exist, five similarity transformation matrices may be determined, one for each of the resolved paths paired with the input path. As another example, an affine similarity transformation matrix M might be determined for a specific set of resolved paths with respect to an input path (e.g., resolved paths positioned near the input path, etc.).

As described, upon aligning paths, a similarity between paths can be determined. To determine similarity between paths, such as an input path and a resolved path, Fréchet distance, or a variant thereof, can be used. Fréchet distance is generally described as a measure of similarity between curves, which can take into account the location and ordering of points along the curves. Assume that (M,d) denotes a metric space and the path is defined as a continuous mapping f: [a, b]→M, where a, b∈$\mathbb{R}$, a≤b. Given two paths f: [a, b]→M and g: [a', b']→M, Fréchet distance $\delta_F$ is generally defined as:

$$\delta_F(f, g) = \inf_{\alpha,\beta\in[0,1]} \max d(f(\alpha(t)), g(\beta(t))) \qquad \text{Equation 2}$$

wherein α(resp. β) is an arbitrary continuous non-decreasing function from [0,1] onto [a, b] (resp. [a', b']). In some cases, before computing the Fréchet distance, the resolved path samples can be multiplied by the corresponding affine similarity transformation matrix M. A Fréchet distance can be calculated in association with each similarity transformation matrix M. For instance, assume that a similarity transformation matrix M is determined for each input-resolved path pair. In such a case, a Fréchet distance, or measure of similarity, can be determined for each input-resolved path pair. The measures of similarity can then be compared to one another, or measured against a threshold, to determine one or more resolved paths to which the input path is similar.

As will be described, analysis associated with corner detection, path sampling, and/or path matching can be used by the path suggestion generator 306 to generate path suggestions. A path suggestion refers to a suggestion or recommendation of a path that can replace or modify another path, such as an input path. In some cases, a path suggestion(s) can be provided as an alternative or option for an input path that is presented to a user for selection. Upon the user selecting a particular path suggestion, a corresponding path, such as an input path, can be replaced or modified to replicate the selected path suggestion. In other cases, a path suggestion(s) may be automatically implemented to modify or replace an input path. For example, an input path may be automatically converted from one curved line to another curved line without selection from a user. As can be appreciated, in such cases, the user may have the option to undo the automatic implementation.

Path suggestions can be identified or generated using any number of beautification rules. Beautification rules generally refer to rules or algorithms used to generate a suggestion for a path that might beautify, or make more precise, the path (e.g., input path). Any number of beautification rules can be accessed and used to generate path suggestions. In some cases, each rule might be applied to determine any appropriate path suggestions. In other cases, a portion of rules might be applied to determine any appropriate path suggestions. For example, assume a path is a curved path. In such a case, beautification rules associated with curved paths may be accessed and used to determine any path suggestions to generate and/or provide to a user. Beautification rules can be accessed from a rule data store.

Figure 5:
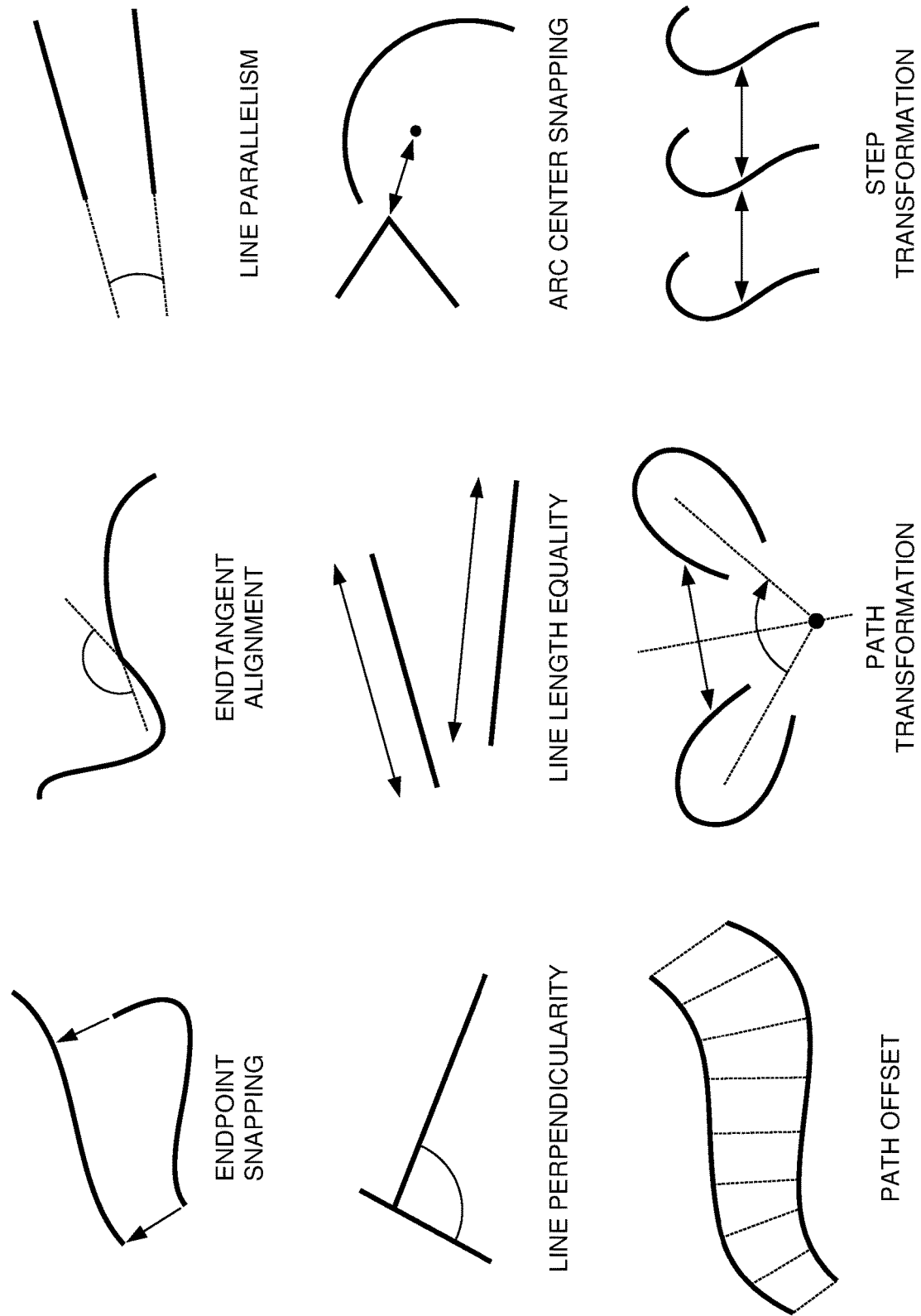
FIG. 5 illustrates examples of beautification rules, in accordance with embodiments of the present disclosure.

FIG. 5 shows examples of beautification rules that are supported by the beautification assistant component 302 to perform beautification. Example rules, some of which are provided in more detail below, include endpoint snapping, end-tangent alignment, line parallelism, line perpendicularity, line length equality, arc-center snapping, path offset, path transformation, and step transformation. In some cases, the path suggestion generator 306 can treat these rules as an extensible set of self-contained rules, each built as a black box and independent of other rules. Each of the rules can represent a single geometric property, such as having an endpoint snapped or as being a reflected version of an existing path.

Although input provided to each rule may differ, such input may include an input path, such as an end-to-end-connected series of Bezier curves, and a set of existing resolved paths. Input may additionally or alternatively include data provided from the path analyzer component 304. For example, an indication of detected corners, an indication of path samples, and/or an indication of path matches (e.g., resolved paths that match or are similar to an input path), etc. The particular input provided to and/or utilized by the path suggestion generator 306 may depend on the beautification rule(s) being assessed. Generally, the path suggestion generator 306 evaluates the likelihood that an input path conforms to a geometric property considering one or more resolved paths.

One beautification rule that can be applied to generate a path suggestion(s) for an input path is a path transformation rule. Path transformation refers to transforming a resolved path, by rotating, scaling, and/or translating, such that the transformed path generally aligns with an input path. A transformation that generally or substantially aligns a resolved path within to the input path can be identified. A resolved path might be generally or substantially aligned with an input path when the paths are within a predetermined threshold distance, a range, or an extent from one another. In this regard, in cases that an input path appears to be sufficiently similar to a resolved path, the resolved path can be transformed in a manner that corresponds with the input path. The transformed resolved path can then be generated as a path suggestion. By way of example only, assume a Fréchet distance indicates an input path is sufficiently similar to a resolved path (e.g., as determined by the path analyzer 304). In such a case, a path suggestion of the resolved path transformed by the matrix transformation M can be generated. Using the matrix M to transform the resolved path enables generation of a suggested path that corresponds with the input path. For instance, upon computing a Fréchet distance, it can be determined that the input path is close to being a rotated, scaled, and/or translated version of a particular resolved path. As such, a path suggestion that is a rotated, scaled, and/or translated version of the resolved path can be generated such that instead of resolving a freeform input path as input, the transformed version of the resolved path can replace the freeform input path.

Another beautification rule that can be applied to generate a path suggestion(s) for an input path is a transformation adjustment rule. A transformation adjustment refers to a modification(s) being performed to a transformed path to create symmetries, align paths, and/or equalize spacing. In this regard, when two paths are similar to one another, a transformation adjustment can be applied to improve the preciseness of a path (e.g., an input path). As such, for an input path and a resolved path of the same shape, a transformation adjustment can be performed to provide a path suggestion for the input path. For example, assume that one path is determined to be 1.1 times the size of another path. Being exactly the same size, however, may be more precise and, accordingly, provided as a path suggestion.

To generate a path suggestion in the form of a transformation adjustment, in instances that an input path is similar to a resolved path, a transformed path that generally aligns with an input path (by way of rotation, scale, and/or translation of a resolved path) is adjusted. As such, to determine a path suggestion(s) based on transformation adjustments, a matrix M that transforms a resolved path to correspond, or align, with an input path, can be separated into rotation, scale, and translation components as follows:

rotation=$a \tan 2(s \sin, s \cos)$ scale=$\sqrt{s\cos^2 + s\sin^2}$ translation=$(tx, tx)$ A transformation, or matrix transformation, can be adjusted in various ways to generate any number of suggestions, for instance, using the rotation component, the scale component and/or the translation component. As is described, various adjustments may include rotation snapping, scale snapping, translation snapping, step-transform snapping, and/or reflection-axis snapping.

Figure 6:
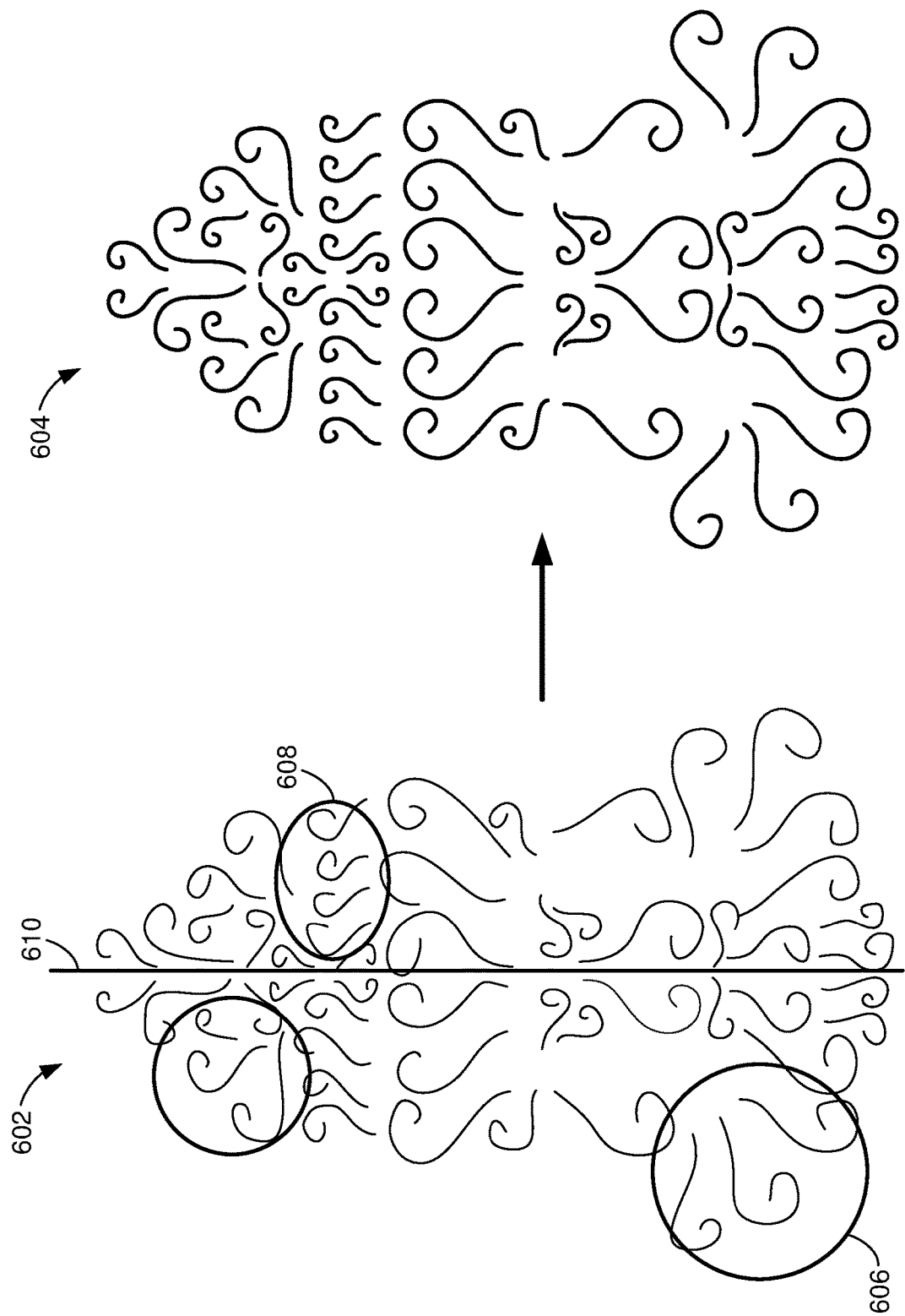
FIG. 6 illustrates examples of beautification rules, in accordance with embodiments of the present invention.

Rotation snapping refers to a rotation adjustment to a transformation (transformation of a resolved path) to generate a path suggestion. To determine a rotation adjustment to apply, the rotation component associated with the transformation of a resolved path can be used. In some embodiments, if the rotation component is close to or about an angle that is an integral divisor of $2\pi$, an adjusted transformation can be applied accordingly so that a path suggestion is provided with that precise angle (e.g., 45 degrees). For example, assume that the rotation component associated with a path transformation is 43 degrees. Because 43 degrees is about 45 degrees, an integral divisor of $2\pi$, the path transformation can be adjusted to 45 degrees to provide a path suggestion that has an angle of 45 degrees. Such a path suggestion can be beneficial to the user as the user may have intended to provide a freeform input with a 45 degree angle. FIG. 6 provides an example result of rotation snapping. In FIG. 6, drawing 602 represents freeform inputs provided by a user, while drawing 604 represents transformation adjustments applied to the freeform input to obtain a symmetrical output. One example of rotation snapping is applied in association with paths 606. Any threshold value can be used to determine whether the rotation component is sufficiently close to a target rotation (e.g., integral divisor of $2\pi$). Further, although an integral divisor of $2\pi$ is used herein as a target rotation for assessing and performing rotation snapping, as can be appreciated, any rotations can be designated.

Scale snapping refers to a scale adjustment to a transformation (transformation of a resolved path) to generate a path suggestion. To determine a scale adjustment to apply, the scale component associated with the transformation of a resolved path can be used. In some embodiments, if the scale component is close to or about an integer or half an integer, an adjusted transformation can be applied accordingly so that a path suggestion is provided with that precise scale (e.g., multiple of integer or half integer). For example, assume that the scale component associated with a path transformation is 1.9. Because a scale of 1.9 is close to the integer 2, the path transformation can be adjusted to a scale of 2 to provide a path suggestion having a scale of 2. Such a path suggestion can be beneficial to the user as the user may have intended to provide a freeform input that is twice the scale of an existing path. Any threshold value can be used to determine whether the scale component is sufficiently close to a target scale (e.g., integer or half integer). Further, although an integer and half integer are used herein as a target scale for assessing and performing scale snapping, as can be appreciated, any scales can be designated (e.g., quarter integers, etc.).

Translation snapping refers to a translation adjustment to a transformation (transformation of a resolved path) to generate a path suggestion. To determine a translation adjustment to apply, a component(s) associated with the transformation of a resolved path can be used. In some embodiments, translation snapping can take several forms. As one example, if the transformation includes a rotation component, a rotation center is identified and compared to existing points in the drawing. If the rotation center is sufficiently close to an existing point, the translation is adjusted to place the center of rotation at that point. As another example, if the transformed path is a reflected version of a resolved path, the axis of reflection is computed and, thereafter, the resolved path is reflected across this axis. If the path is sufficiently close to this reflected path, we adjust the translation to move it to that position. As yet another example, the x and/or y components of the translation can be adjusted to zero (or other target value, such as a half integer). For instance, assume that the translation component associated with a transformed path is (100, 3). In such a case, the user may have desired to translate a curved path input by 100 in the lateral direction, but have the same y-coordinate such that two paths are aligned. Accordingly, the translation can be adjusted to (100, 0). Such a path suggestion can be beneficial to the user as the user may have intended to provide a freeform input that represents a particular translation. Any manner or number of rules can be applied to determine translation adjustments for generating path suggestions.

Step-transform snapping enables creation of multiple, equally transformed copies of a path. For example, FIG. 6 provides an example of step-transform snapping in relation to paths 608. Generally, to perform step-transform snapping, a first transformation associated with two resolved paths is compared to a second transformation between a resolved path and an input path. When the first transformation between the resolved paths is determined to be sufficiently similar to the second transformation between one of the resolved paths and the input path, the second transformation can be adjusted to be the same as the first transformation to create equally transformed copies of a path.

Figure 7B:
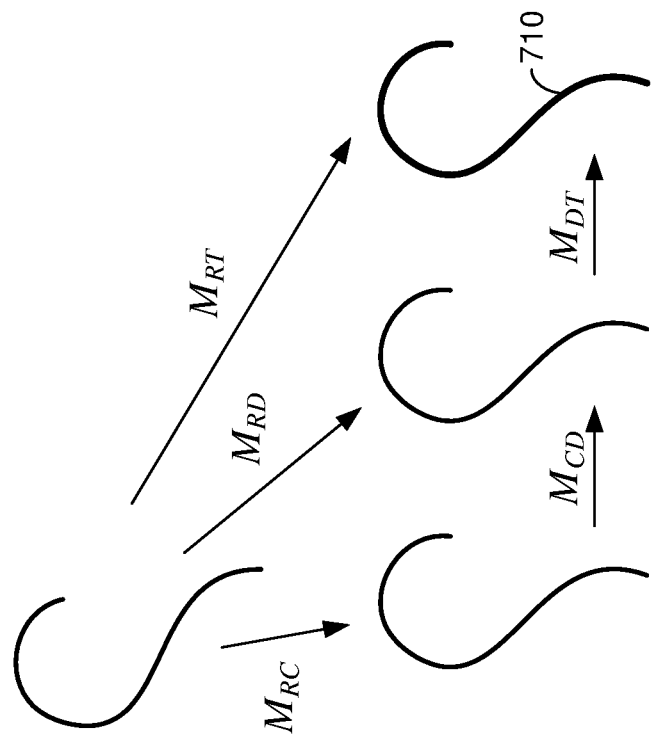
FIGS. 7A-7B illustrates an example of step-transform snapping, in accordance with embodiments of the present disclosure.
Figure 7A:
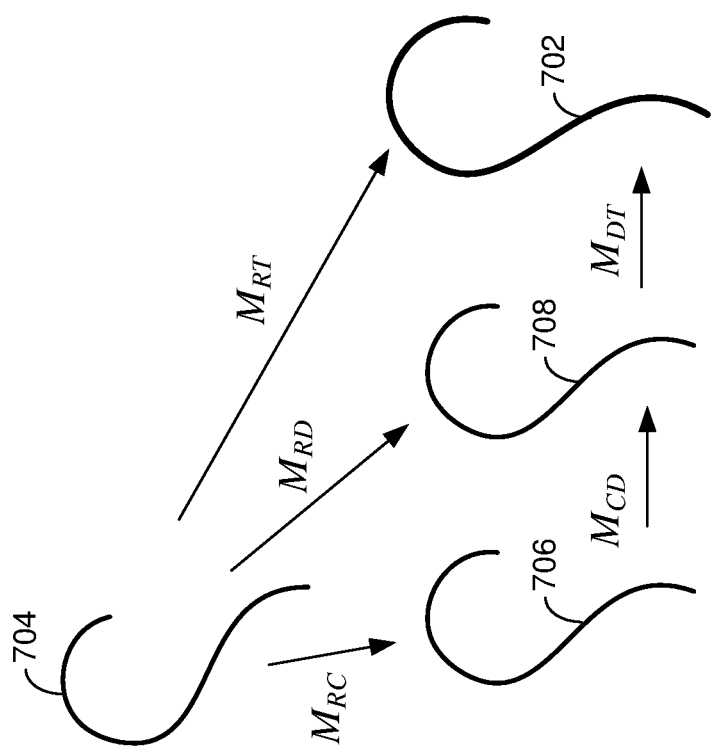

By way of example, and with reference to FIGS. 7A and 7B, a new input path T 702 is compared to three existing paths R 704, C 706 and D 708. Assume that the transformation matrix $M_{DT}$ from path D to path T is similar to the transformation matrix $M_{CD}$ from path C to path D. As such, the step transformation between path D and T can be adjusted to equal the step transformation between path C and D so that path T is positioned to match the step transform between paths C and D, as illustrated in FIG. 7B. Path T 710 as reflected in FIG. 7B can then be provided as a suggested path. In some cases, matrices relative to path R may be stored, while other matrices are not stored. In such cases, matrix $M_{RC}$ and $M_{RD}$ can be used to compute $M_{CD}$. Accordingly, when matrix $M_{DT}$ is to be the same as $M_{CD}$, this can be performed by adjusting $M_{RT}$ so that it results in $M_{DT}$ being the same as $M_{CD}$. Although this example only includes translation in the step transform, other transformations including rotation, scale, and/or reflection are contemplated to perform step-transform snapping.

Reflection-axis snapping is used to reflect paths against an axis of reflection or to reflect a path across an existing line segment. For example, FIG. 6 provides an example of a reflection axis 610 for use in reflection-axis snapping. To perform reflection-axis snapping, existing axes of reflection and line segments can be identified. An existing axis of reflection may exist when one existing path is a reflected version of another existing path. As such, the existing axis can be used as a potential reflection axis for additional paths (e.g., a new input path). If a new input path appears reflected, its axis of reflection can be compared to existing axes. When the axis of reflection associated with the new input path is sufficiently close to an existing axis, a suggestion to reflect across the existing axis can be generated.

Another beautification rule that can be applied to generate a path suggestion(s) for an input path is an arc and circle center snapping rule. An arc and circle center snapping rule is generally used to align a center point of an arc or circle with a point of a resolved path. For example, a center point of an arc or circle might be aligned with an endpoint of another path, a center associated with another arc or circle path, a center of rotation associated with another path, a center of a polygon associated with a resolved path (e.g., polygons composed from series of line segments), etc. To align a center point of an arc or circle with a resolved path point, the distance between an input center and potential resolved path points can be evaluated. When the input center point is within a threshold distance of a resolved path point, the input center point might be automatically snapped or aligned with the resolved path point and the radius of the input arc or circle might be adjusted. In another case, when the input center point is within a threshold distance of a resolved path point(s), a suggestion to snap or align the input center point with the resolved path point may be provided to a user.

In some implementations, a predetermined threshold distance may be applied to determine if the input center point is within a threshold distance of a resolved path point. For instance, a standard search distance radius D may be assessed to determine if the input center point is within the distance radius D relative to a resolved path point. In another implementation, a threshold distance can be dynamically determined and used to determine if the input center point is within the dynamically determined threshold distance. Such an adaptive search radius can be beneficial to effectively capture a user's intent. For example, arcs with small angular spans are difficult to draw precisely without a guide (e.g., users tend to draw the arc too curved). As such, the identified center of the input arc might be positioned at a distance too far apart from a desired center point. In the event a fixed threshold distance D is used to assess whether the center of the input arc is within the distance D of a resolved path point, the center of the input arc might not be aligned with a desired resolved path point. As a result, adaptive expansion of the search radius D' increases the likelihood that an imprecise input will provide the user the expected, precise output.

Figure 8C:
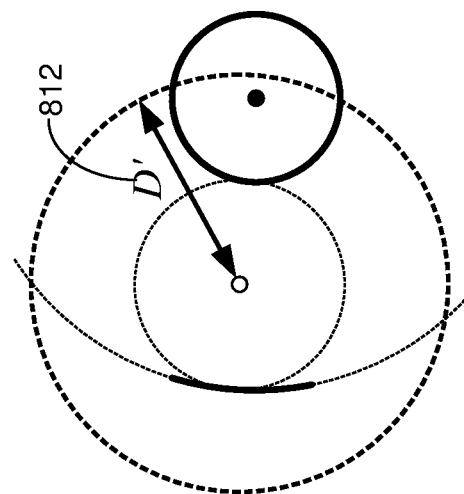
FIGS. 8A-8C illustrate an example of arc and circle center snapping in accordance with embodiments of the present disclosure.
Figure 8B:
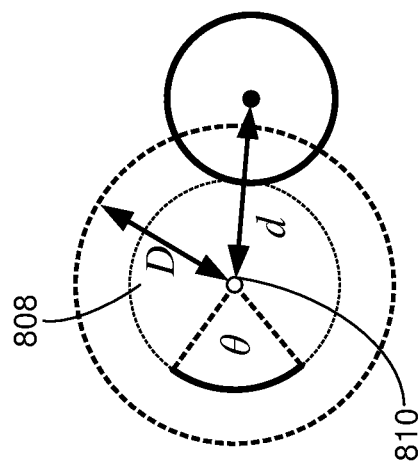
Figure 8A:
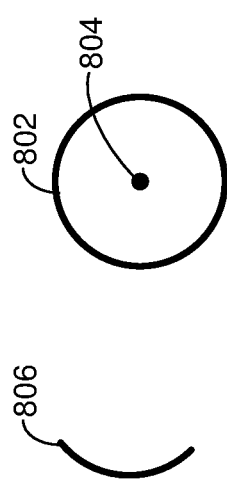

For example, and with reference to FIGS. 8A-8C, assume that a resolved path 802 of FIG. 8A exists and has a resolved center point 804. Further assume that input path 806 is drawn by a user. Using a fixed threshold D 808, it can be determined that the center point 810 of the input path is not within threshold distance D to the resolved center point, as illustrated in FIG. 8B. As such, the center point 810 is not aligned or snapped to the resolved center point 804. Using an adaptive search radius D' 812 of FIG. 8C, however, it can be determined that the center point 810 of the input path is within the threshold distance D' to the resolved center point. Accordingly, the center point 810 is aligned or snapped to the resolved center point 804. In addition, the radius of arc 806 is adjusted to be the distance between arc 806 and the resolved center point 804.

Various methods may be employed to adaptively modify a threshold distance for assessing whether to align an input center point with a resolved path point. In some cases, an adaptive threshold might be determined such that the search radius or threshold distance becomes larger as the span of the arc (e.g., θ) becomes smaller. As one example, the adaptive threshold D' can be determined as follows:

$$2r(1-\theta/2\pi) \qquad \text{Equation 3}$$

wherein θ is the span of the input arc, and r is its radius. θ/2π refers to a fraction of a circle. As such, if θ equals π, θ/2π is ½ a circle. As can be appreciated, 1−θ/2π approaches 1 as the arc gets smaller.

In some cases, the adaptive threshold might be a selection between D' or D. For example, a maximum distance of D or an adaptive distance D' (e.g., 2r(1−θ/2π) might be selected for use in assessing distance between an input center path and a resolved path point, as shown below:

$$\text{Distance} = \max\left(D, 2r\left(1 - \frac{\theta}{2\pi}\right)\right) \qquad \text{Equation 4}$$

wherein θ is the span of the input arc, r is its radius, and D is the standard or predetermined search distance radius. In one implementation, a value for D of 30 view space pixels is used.

As previously described, other beautification rules can be applied to generate a path suggestion(s) for an input path. For example, other beautification rules may include line detection, arc detection, endpoint snapping, end tangent alignment, line parallelism and perpendicularity, line length equality, and path offset, etc. For the line detection rule, line straightness is estimated by measuring a ratio between length of a path and a distance between its endpoints. For the arc detection rule, an input path is sampled and a least-squares circle fit is performed on the samples to obtain center and radius parameter values. To determine the angular span value, the samples are projected onto the circle fit. The arc can then be sampled again and the discrete Fréchet distance evaluated between the arc samples and the samples of the input path. When the span is close to 2π or the path is closed, it is replaced with a full circle.

For the endpoint snapping rule, a distance between each of the path endpoints and resolved endpoints is examined Additionally, snapping to inner parts of the resolved paths is also examined Specialized tests based on the properties of line segments and circular arcs lower the computational complexity of this operation. For the end tangent alignment rule, if the path endpoint is snapped, the angle between its tangent and the tangent of the point to which it is attached is measured. If the tangents are sufficiently close, the path is adjusted to make the attachment smooth.

For the line parallelism and perpendicularity rule, the angle between two line segment paths is compared with the angle needed to satisfy the parallelism or perpendicularity constraint. The distance taken between the line segments is also taken into account to slightly increase the priority of nearby paths. For line length equality, the ratio of length of both tested line segments is evaluated. The mutual distance is incorporated into a final likelihood computation. For the path offset rule, offset paths generalize line parallelism. To detect these paths, the beautification assistant module 108 progresses along the path and measures its distance to the resolved path.

In accordance with embodiments of the present invention, the path suggestion generator 306 can generate path suggestions based on single-segment path processing and/or multi-segment path processing. Single-segment path processing refers to processing a path (e.g., input path) based on a single segment. In some cases, a single segment is a segment without any corners detected in the segment. In other cases, a single segment can be processed irrespective of having detected corners. For instance, an entire path with multiple segments, defined or split by corner features, can be processed as a single segment to provide a path suggestion(s). Single-segment path processing can utilize any number of the beautification rules described above with respect to a single-segment path to generate a path suggestion(s).

Multi-segment path processing refers to processing a path (e.g., input path) based on a multiple segments. In some cases, multiple segments can be detected based on corner detection, as described above. In this regard, segments defined or split by corner features of an input path can be individually processed to provide suggestion paths. By way of example, assume that a single input stroke is drawn generally in the shape of a triangle. For instance, a user may draw a triangle by way of touch input without lifting her or his finger from the touch screen until the triangle is completed, or mostly completed. In such a case, corners of the triangle can be detected to generate multiple segments for processing or evaluating. As such, once divided into segments, the path suggestion generator 306 can utilize the segments along with one or more beautification rules to generate path suggestions for the input path. To this end, the path suggestion generator 306 provides path suggestions based on multiple segments of a single stroke (e.g., input path). Such an implementation can provide more accurate path suggestions as opposed to requiring a user to draw every segment independently (e.g., draw a $1^{st}$ stroke, draw a $2^{nd}$ stroke, and draw a $3^{rd}$ stroke to complete a triangle).

As described, multi-segment path processing enables processing of paths with multiple segments. For example, assume that one input path is drawn by a user and, upon detecting a corner (e.g., via path analyzer 304), the path suggestion generator 306 can process the multiple segments using one or more beautification rules. In some implementations, segments of the path, such as an input path, can be processed one at a time to generate one or more path suggestions to provide as output. For example, a first segment can be assessed to determine a first set of path suggestions; a second segment can then be assessed to determine a second set of path suggestions, and so on. The second set of path suggestions might be in addition to the first set of path suggestions. In other cases, the second set of path suggestions modify the first set of path suggestions based on the assessment of the second segment. For instance, processing multi-segment input may include automatic selection of intermediate path suggestions.

As the number of potential path suggestions can increase significantly as multiple segments are analyzed, in some implementations, the path suggestions can be reduced to make the evaluation of complex inputs computationally feasible within real-time-to-interactive response time. To reduce the number of path suggestions, a threshold number of unique suggestions can be applied. For instance, in some cases, after analyzing each of the segments, the total number of path suggestions may be limited (e.g., 10 path suggestions). In other cases, the number of unique suggestions for each segment can be limited (e.g., 3 path suggestions for each segment or segment addition). Alternatively or additionally, the individual segments can be processed in a breadth-first manner that enables reduction once all the parallel states reach the same depth (i.e., all have the same number of processed segments). Each intermediate state can be assigned a value that is calculated as the arithmetic mean of the scores of the processed segments. $N_{IS}$ intermediate states can be further analyzed while the remaining intermediate states are discarded. The performance of multi-segment path processing may be determined by the number of segments K and the intermediate stack size $N_{IS}$, with $N_{IS}=1$ being performance-wise equal to sequential processing of individual segments.

As can be appreciated, as the individual segments are associated with a single path (e.g., an input curve), the beautified proposed segments can be consecutively joined to constrain the position of the first end point of each segment after the first segment. Additionally, if the multi-segment path is closed, the last segment's final endpoint can be constrained, which can decrease ambiguity.

By way of example only, and with reference to FIG. 9, assume that corner detection (e.g., applied via path analyzer 304) detects three corners and splits the input path 902 into three segments, segment 904, 906, and 908, which may be processed sequentially. Initially, the first segment 904 is assessed to determine one or more path suggestions (e.g., using any number of beatification rules). As shown in FIG. 9, path suggestions 910 (an arc) and 912 (straight line) are generated. Turning to the second segment 906, path suggestions 914, 916, 918, and 920 can be generated, for instance, based on the previous segments and, in some cases, a resolved path(s). As shown in FIG. 9, the beginning point of the second segment 906 may be constrained to align with or match the final endpoint of the previous segment 904. Further, assume that a limited number of three path suggestions is desired in connection with each segment. In such a case, the fourth path suggestion 920 can be removed as a path suggestion. Now, turning to the third segment 908, path suggestions 922, 924, and 926 are generated, for instance, based on the previous segments and, in some cases, a resolved path(s).

The path provider 308 is generally configured to provide a set of one or more path suggestions. As illustrated in FIG. 3, the path provider 308 can provide a suggested path 316 and a suggested path 318. Although not illustrated, the suggested paths can be provided for display on the user device. In a client-server environment, such suggested paths can be provided over a network to a user device for display on the user device. As previously described, a path suggestion refers to a suggestion or recommendation of a path that can replace or modify another path, such as an input path. In some cases, a path suggestion(s) can be provided as an alternative or option for an input path that is presented to a user for selection. Upon the user selecting a particular path suggestion, a corresponding path, such as an input path, can be replaced or modified to replicate the selected path suggestion. In other cases, a path suggestion(s) may be automatically implemented to modify or replace an input path. For example, an input path may be automatically converted from one curved line to another curved line without selection from a user. As can be appreciated, in such cases, the user may have the option to undo the automatic implementation.

Figure 10C:
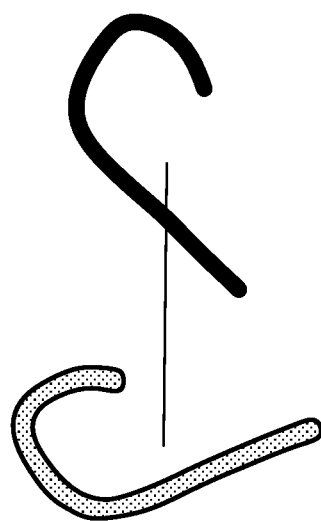
FIGS. 10A-10C illustrate visual annotations of applied rules, in accordance with embodiments of the present disclosure.
Figure 10B:
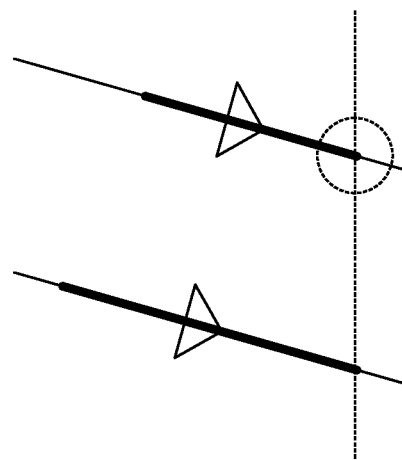
Figure 10A:
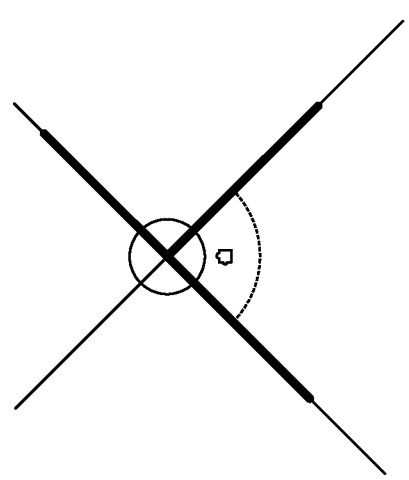

The presentation of path suggestions can occur in any manner In some cases, multiple path suggestions are simultaneously presented. In other cases, path suggestions are subsequently presented such that only one suggestion is presented at a time. In such a case, a user may switch among path suggestions, for example, using a tool panel. The first path suggestion may be a suggestion associated with a greatest or highest path score, while a last suggestion may be the original input path. A user may select a currently presented suggestion in any manner, such as by drawing a new input path or changing a selection. In some cases, to provide assistance to a user, a simple visualization of applied beautification rule(s) can be provided along with the suggested path. Such a visualization can provide feedback to the user about imposed constraints and relations of the user input. For example, with reference to FIGS. 10A-10C, FIGS. 10A-10C illustrate visual annotations in accordance with embodiments herein. In particular, FIG. 10A illustrates a visual annotation indicating a line perpendicularity and endpoint snapping rule, FIG. 10B illustrates a visual annotation indicating a line parallelism and single coordinate snapping rule, and FIG. 10C illustrates a visual annotation indicating a path transformation rule.

In some cases, the path provider 308 can select one or more path suggestions to provide based on a corresponding path score for path suggestions. Such a score can be generated or determined by any component, such as the path suggestion generator 306 (e.g., in association with a beautification rule(s)), the path provider 308, or another component. A path score can represent a likelihood that a suggested path is correct or intended by a user. For example, a same-line-length rule might, for input that is a line segment, create path suggestions that are the same lengths as existing line segments, along with scores that indicate how close the segment's initial length is to the modified length of the corresponding path suggestion. As such, in some cases, the scores may reflect an amount of adjustment performed by respective rules to achieve a respective path suggestion. In some cases, each rule may include a threshold that determines that the score for a path suggestion is too low and, in that case, does not output a suggested path.

The path scores can be compared to one another and/or to a threshold score to determine which path suggestions to provide to a user. For example, for a particular beautification rule, path scores associated with path suggestions derived from the particular beautification rule can be compared to one another to select one or more path suggestions to provide to a user. As another example, path scores associated with path suggestions derived from various beautification rules can be compared to one another to select one or more path suggestions to provide to a user.

Path scores can be determined in any number of ways and may vary depending on the particular beautification rule being applied. In some cases, multiple prior instances of an aspect may strengthen the likelihood a user intended a particular path. For example, with respect to a transformed path, if the drawing includes multiple instances of a path, it is more likely that the user intended a new input path to match the previously resolved paths. As such, a score for a suggested transformed path may be boosted by replacing or modifying the score with $1-(1-s)^{In\ i}$, where i is the number of existing instances. As another example, with respect to reflection axis snapping, for an axis that has been used multiple times for path reflection, it is more likely that the user intended a new input path to be reflected via that axis. According, a score for a suggested transformation adjustment may be increased by replacing or modifying the score with $1-(1-s)^{In\ i}$, where i is the number of instances the axis has been used.

Figure 11:
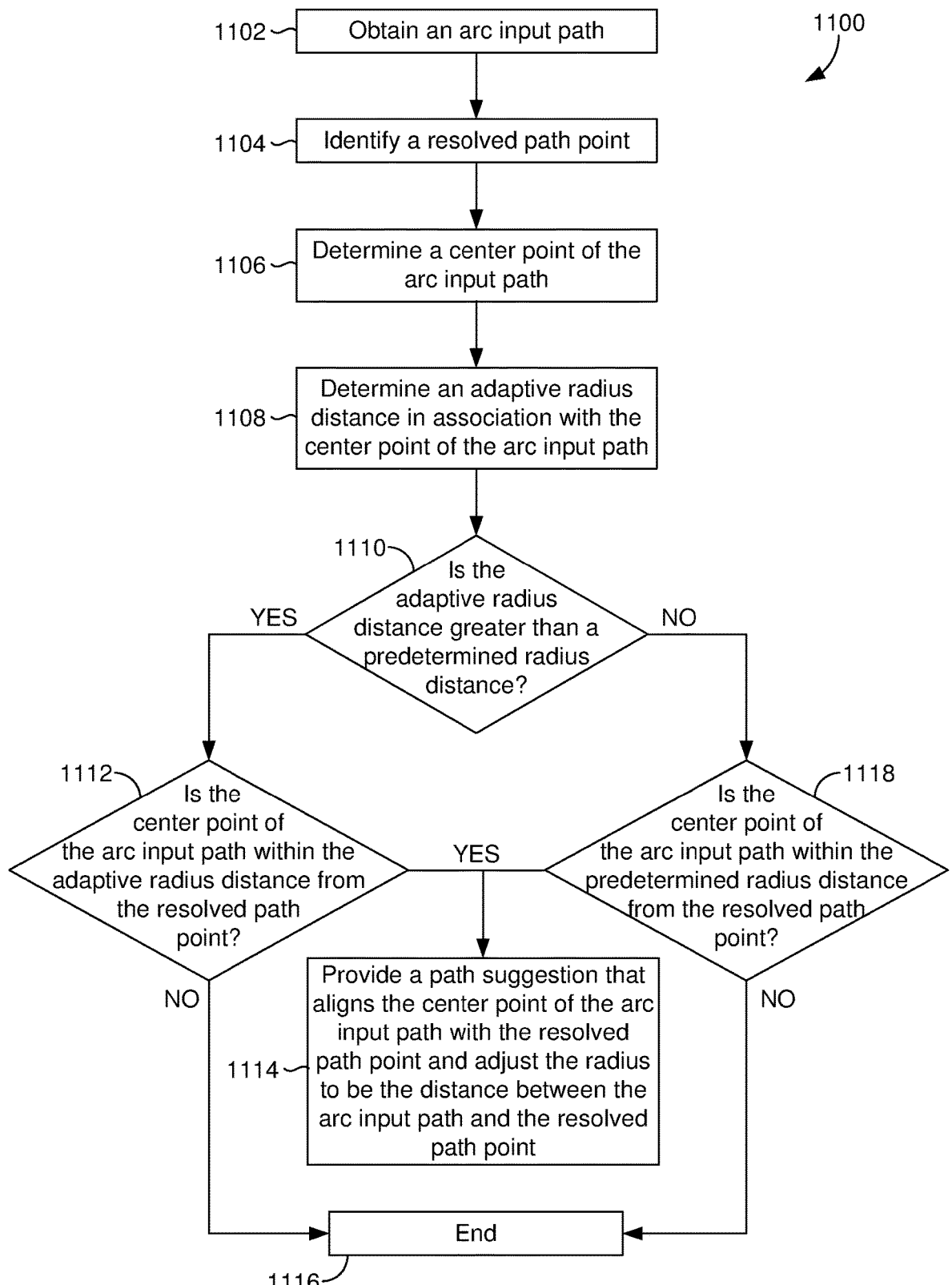
FIG. 11 is a flow diagram showing a first method for facilitating beautification of freeform drawings in accordance with embodiments of the present disclosure.

Referring now to FIG. 11, a flow diagram is provided showing an embodiment of a method 1100 for facilitating beautification of freeform drawings. In particular, FIG. 11 provides a method for implementing an arc and circle center snapping beautification rule. Each block of method 1100 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Initially, at block 1102, an arc input path is obtained. An arc input path can be provided by a user, for example via a touch screen, and obtained by a beautification assistant component (e.g., beautification assistant component 302 of FIG. 3). At block 1104, a resolved path point is identified. A resolved path point refers to a point on or associated with a resolved path, such as an endpoint of another path, a center associated with another arc or circle path, a center of rotation associated with another path, a center of a polygon associated with a resolved path (e.g., polygons composed from series of line segments), etc. At block 1106, a center point of the arc input path is determined. At block 1108, an adaptive radius distance is determined in association with the center point of the arc input path. In embodiments, the adaptive radius distance can be determined such that the search radius becomes larger as the span of the arc (e.g., θ) becomes smaller. Subsequently, at block 1110, it is determined whether the adaptive radius distance is greater than a predetermined radius distance. If the adaptive radius distance is greater than the predetermined radius distance, the adaptive radius is used to determine if a center point of the arc input path is within the adaptive radius distance from the resolved path point, as indicated at block 1112. If so, a path suggestion is provided that aligns the center point of the arc input path with the resolved path point and adjusts the radius to be the distance between the arc input path and the resolved path point, as indicated at block 1114. If not, the method ends, as indicated at block 1116. Returning to block 1110, if the adaptive radius distance is not greater than the predetermined radius distance, the predetermined radius distance is used to determine if a center point of the arc input path is within the predetermined radius distance from the resolved path point. This is indicated at block 1118. If so, a path suggestion is provided that aligns the center point of the arc input path with the resolved path point and adjusts the radius to be the distance between the arc input path and the resolved path point, as indicated at block 1114. If not, the method ends, as indicated at block 1116.

Figure 12:
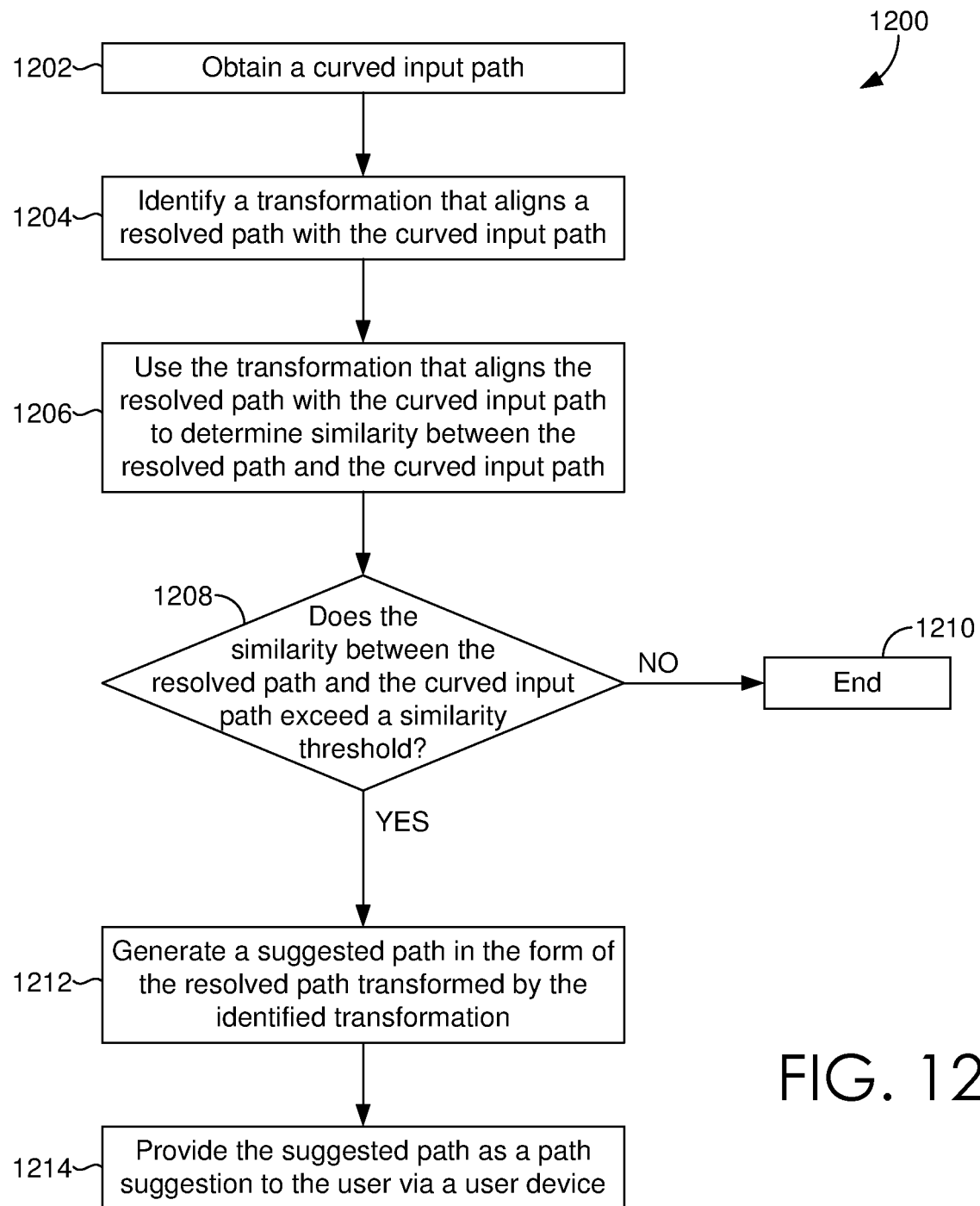
FIG. 12 is a flow diagram showing a second method for facilitating beautification of freeform drawings in accordance with embodiments of the present disclosure.

Referring now to FIG. 12, a flow diagram is provided showing one embodiment of a method 1200 for facilitating beautification of freeform drawings. In particular, FIG. 12 provides a method for implementing a path transformation beautification rule. Initially, at block 1202, a curved input path is obtained. A curved input path can be provided by a user, for example via a touch screen, and obtained by a beautification assistant component (e.g., beautification assistant component 302 of FIG. 3). At block 1204, a transformation that aligns a resolved path with the curved input path is identified. In embodiments, to align paths, an affine similarity matrix that transforms the resolved path to match the input path as closely as possible can be determined. An affine similarity matrix can include a composition of a rotation, a scale, and a translation. At block 1206, the transformation that aligns the resolved path with the curved input path is used to determine an extent of similarity between the resolved path and the curved input path. For example, the resolved path can be multiplied by an affine similarity matrix. Thereafter, a Fréchet distance can be used to determine an extent of similarity between the resolved path and the curved input path.

At block 1208, a determination is made as to whether the similarity between the resolved path and the curved input path exceeds a similarity threshold. In such a case, it might be determined if a similarity measure is greater than a predetermined similarity threshold or if a similarity measure is greater than other similarity measures associated with other input-resolved path pairs. If it is determined that the similarity between the resolved path and the curved input path does not exceed a similarity threshold, the method ends, as indicated at block 1210. On the other hand, if it is determined that the similarity between the resolved path and the curved input path does exceed a similarity threshold, a suggested path is generated in the form of the resolved path transformed by the identified transformation that aligns a resolved path with the curved input path. This is shown at block 1212. At block 1214, the suggested path is provided as a path suggestion to the user via a user device.

Figure 13:
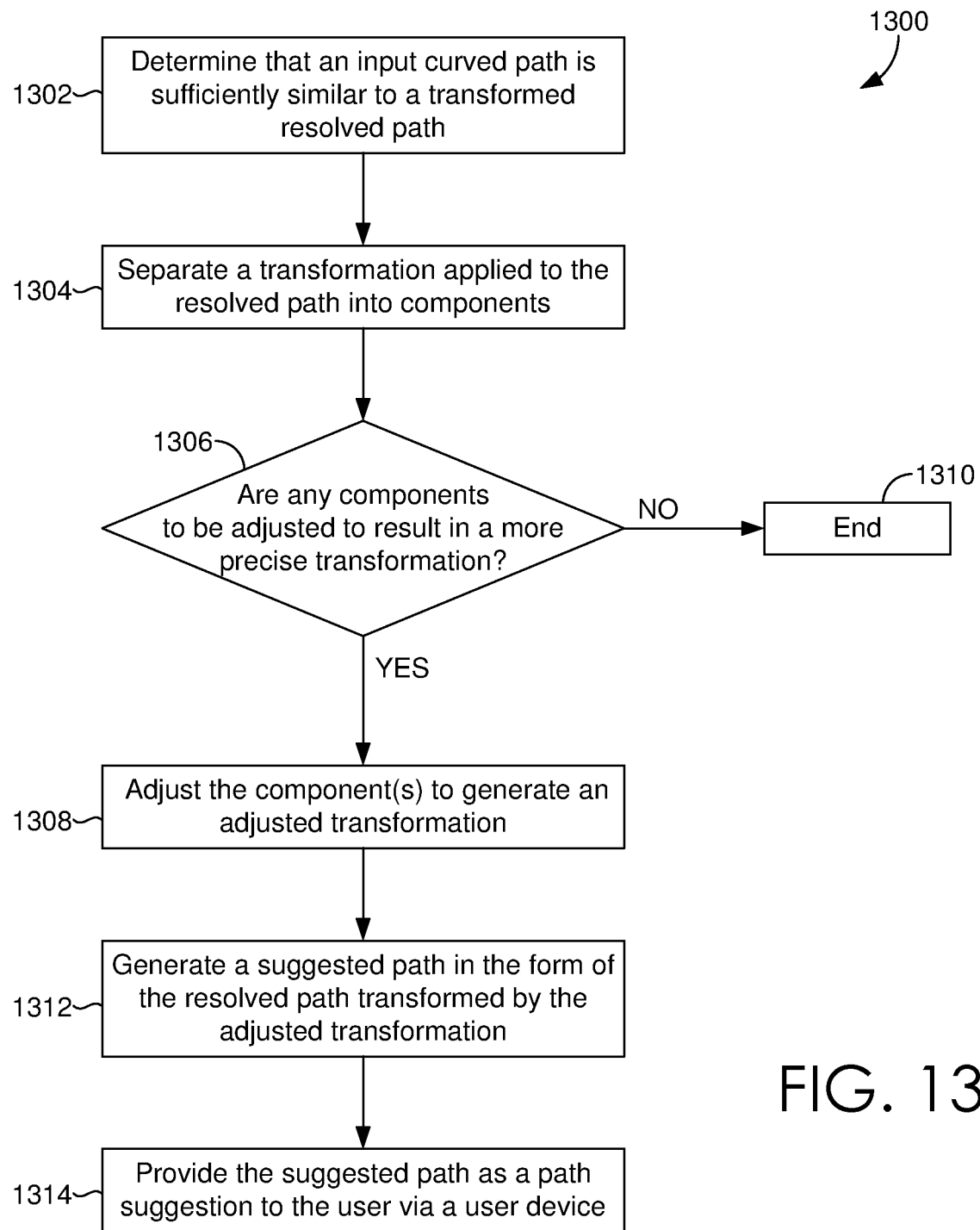
FIG. 13 is a flow diagram showing a third method for facilitating beautification of freeform drawings in accordance with embodiments of the present disclosure.

Referring now to FIG. 13, a flow diagram is provided showing one embodiment of a method 1300 for facilitating beautification of freeform drawings. In particular, FIG. 13 provides a method for implementing a transformation adjustment beautification rule. Initially, at block 1302, a determination is made that an input curved path is sufficiently similar to a transformed resolved path. A transformed resolved path refers to a resolved path that, when transformed, generally aligns with an input path (by way of rotation, scale, and/or translation of a resolved path). To determine an input path is sufficient similar to a transformed resolved path, a Fréchet distance may be computed as a similarity measure between the paths. At block 1304, a transformation applied to the resolved path is separated into components, such as rotation, scale and translation components. At block 1306, each component is analyzed to determine whether the particular component is to be adjusted to result in a more precise transformation. For instance, a rotation component may be assessed to identify whether the rotation is near or about a predetermined amount of rotation (e.g., an integral divisor of 2π). As another example, a scale component may be assessed to identify whether the scale is near or about a predetermined scale amount (e.g., an integer of half integer). As yet another example, a translation component may be assessed to identify whether the translation is near or about a predetermined translation amount (e.g., a translation of 0). If one or more components are to be adjusted to result in a more precise transformation, the component(s) is adjusted to generate an adjusted transformation to be applied, as indicated at block 1308. Otherwise, the method ends at block 1310. At block 1312, a suggested path is generated in the form of the resolved path transformed by the identified adjusted transformation. At block 1314, the suggested path is provided as a path suggestion to the user via a user device.

Figure 14:
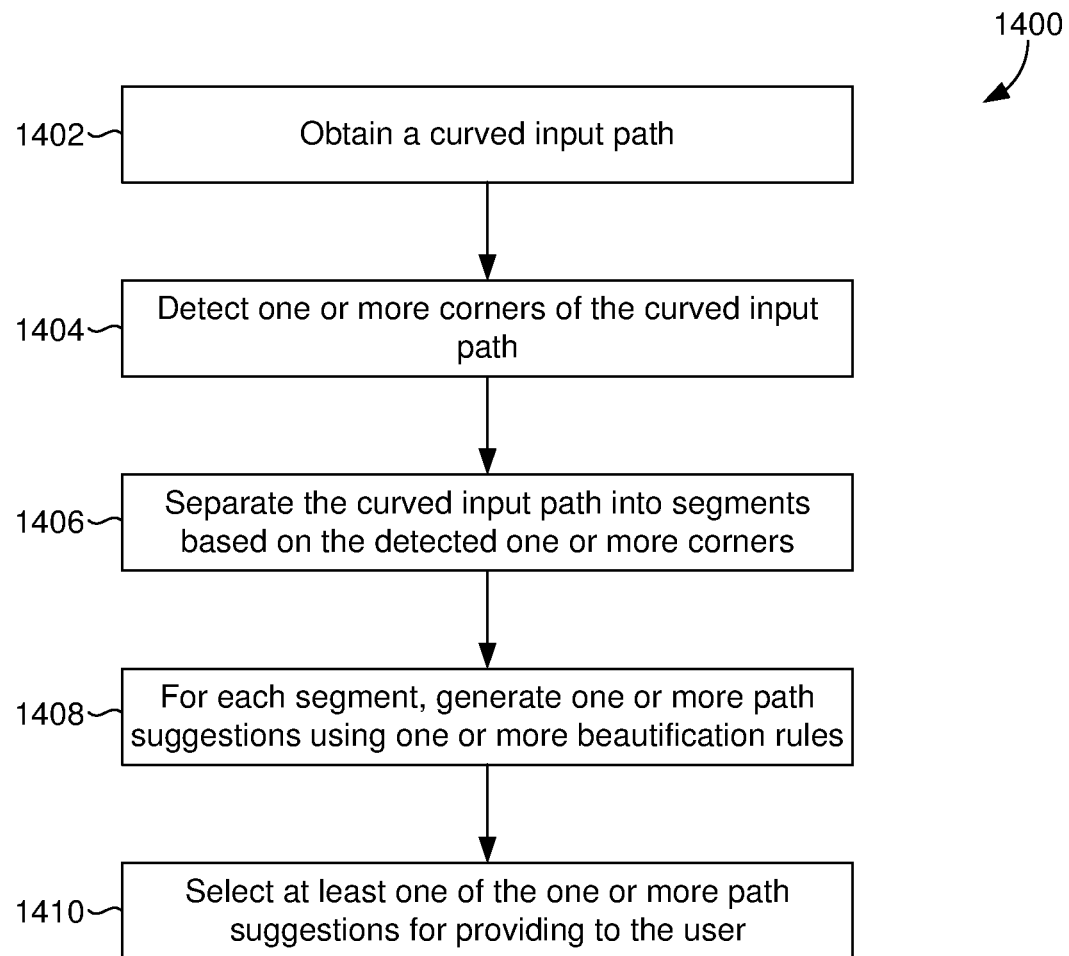
FIG. 14 is a flow diagram showing a fourth method for facilitating beautification of freeform drawings in accordance with embodiments of the present disclosure.

With reference to FIG. 14, a flow diagram is provided showing one embodiment of a method 1400 for facilitating beautification of freeform drawings. In particular, FIG. 14 provides a method for applying beautification techniques to a path having multiple segments. Initially, at block 1402, a curved input path is obtained. A curved input path can be provided by a user, for example via a touch screen, and obtained by a beautification assistant component (e.g., beautification assistant component 302 of FIG. 3). At block 1404, one or more corners of the curved input path are detected. A corner can be detected in any number of ways. In one embodiment, a corner can be detected by calculating tangent vectors at sample points along curves. At block 1406, the curved input path is separated into segments based on the detected one or more corners. At block 1408, for each segment, one or more path suggestions are generated using one or more beautification rules. In some implementations, segments of the input path can be processed one at a time to generate one or more path suggestions to provide as output. For example, a first segment can be assessed to determine a first set of path suggestions; a second segment can then be assessed to determine a second set of path suggestions, and so on. The second set of path suggestions might be in addition to the first set of path suggestions. In other cases, the second set of path suggestions modify the first set of path suggestions based on the assessment of the second segment. At block 1410, at least one of the one or more path suggestions are selected for providing to the user. Path suggestions may be selected based on scores associated with each potential path, etc.

Figure 15:
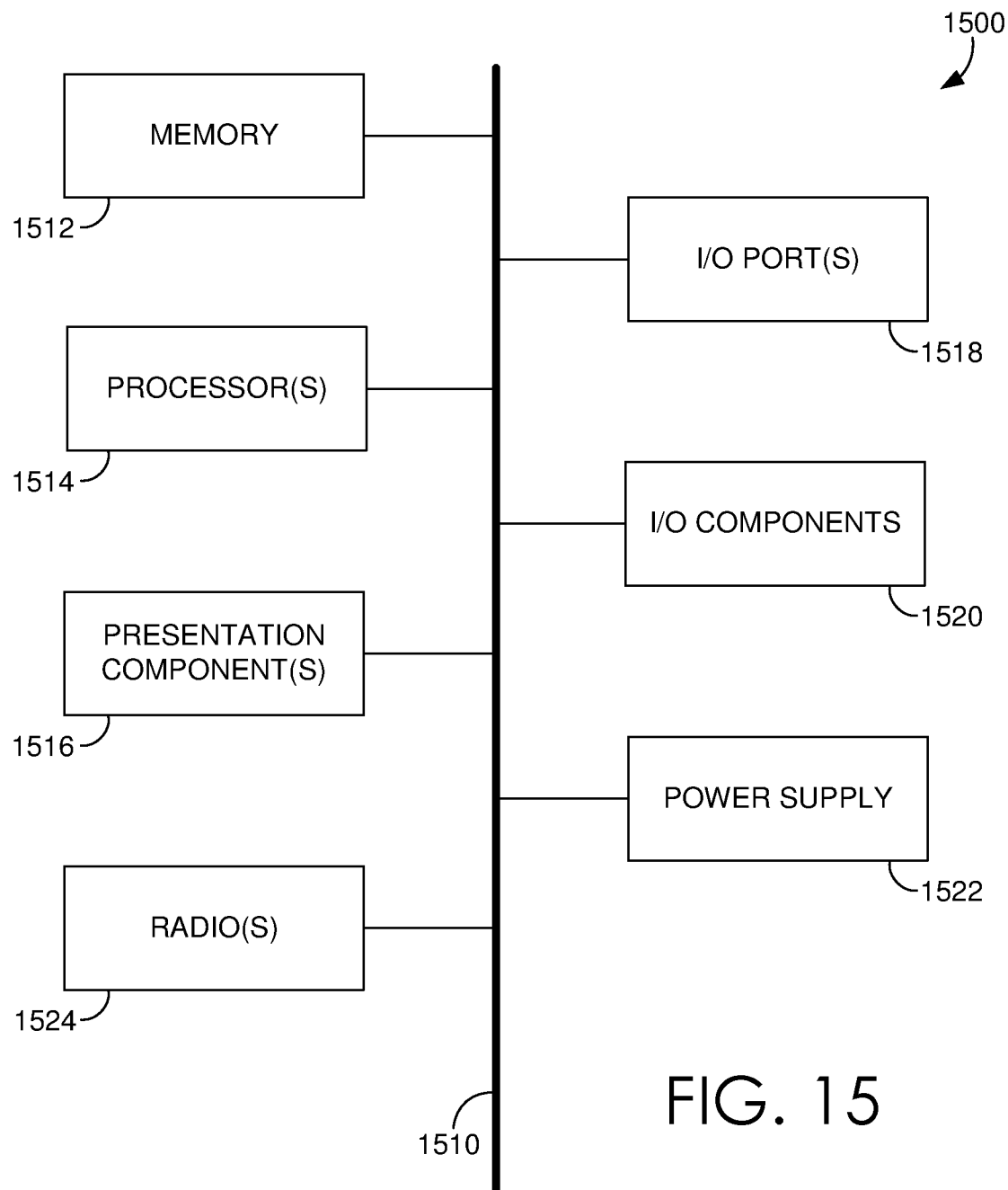
FIG. 15 is a block diagram of an exemplary computing environment suitable for use in implementations of the present disclosure.

Turning now to FIG. 15, FIG. 15 provides a diagram of an exemplary computing environment suitable for use in implementation of the present disclosure. Computing device 1500 includes bus 1510 that directly or indirectly couples the following devices: memory 1512, one or more processors 1514, one or more presentation components 1516, input/output (I/O) ports 1518, input/output components 1520, and illustrative power supply 1522. Bus 1510 represents what may be one or more busses (such as an address bus, data bus, or combination thereof). Although the various blocks of FIG. 15 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 15 is merely illustrative of an exemplary computing device that can be used in connection with one or more embodiments of the present invention. Distinction is not made between such categories as "workstation," "server," "laptop," "handheld device," etc., as all are contemplated within the scope of FIG. 15 and reference to "computing device."

Computing device 1500 typically includes a variety of computer-readable media. Computer-readable media can be any available media that can be accessed by computing device 1500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1500. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1512 includes computer-storage media in the form of volatile and/or nonvolatile memory. The memory may be removable, non-removable, or a combination thereof. Exemplary hardware devices include solid-state memory, hard drives, optical-disc drives, etc. Computing device 1500 includes one or more processors that read data from various entities such as memory 1512 or I/O components 1520. Presentation component(s) 1516 present data indications to a user or other device. Exemplary presentation components include a display device, speaker, printing component, vibrating component, etc.

I/O ports 1518 allow computing device 1500 to be logically coupled to other devices including I/O components 1520, some of which may be built in. Illustrative components include a microphone, joystick, game pad, satellite dish, scanner, printer, wireless device, etc. The I/O components 1520 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1500. The computing device 1500 may be equipped with depth cameras, such as stereoscopic camera systems, infrared camera systems, RGB camera systems, and combinations of these, for gesture detection and recognition. Additionally, the computing device 1500 may be equipped with accelerometers or gyroscopes that enable detection of motion. The output of the accelerometers or gyroscopes may be provided to the display of the computing device 1500 to render immersive augmented reality or virtual reality.

The present invention has been described in relation to particular embodiments, which are intended in all respects to be illustrative rather than restrictive. Alternative embodiments will become apparent to those of ordinary skill in the art to which the present invention pertains without departing from its scope.

What is claimed is:

1. One or more computer storage media storing computer-useable instructions that, when used by one or more computing devices, cause the one or more computing devices to perform operations comprising:

classifying, based on a freeform path added to an electronic drawing subsequent to previously existing resolved paths in the electronic drawing, a resolved path of the previously existing resolved paths in the electronic drawing as being a same shape as the freeform path, the freeform path having at least one curved element, by:
identifying a first transformation that aligns the resolved path with the freeform path;
applying the first transformation to the resolved path to generate a transformed resolved path;
determining a measure of similarity between the transformed resolved path and the freeform path; and
determining, based on the measure of similarity, that the transformed resolved path is the same shape as the freeform path;
determining that the first transformation is to be adjusted to optimize the transformed resolved path;
generating an adjusted transformation adjusting the first transformation;
applying the adjusted transformation to the resolved path to generate a path suggestion; and
providing the path suggestion to facilitate an adjustment to the freeform path to match the path suggestion.

2. The media of claim 1, wherein determining that the first transformation is to be adjusted comprises a determination that a rotation component of the first transformation falls within a threshold of a predetermined rotational value, and wherein applying the adjusted transformation comprises rotation snapping to the predetermined rotational value.

3. The media of claim 1, wherein determining that the first transformation is to be adjusted comprises a determination that a scale component of the first transformation falls within a threshold of a predetermined scale, and wherein applying the adjusted transformation comprises scale snapping to the predetermined scale.

4. The media of claim 1, wherein determining that the first transformation is to be adjusted comprises a determination that a component of the first transformation falls within a threshold of a predetermined translation, and wherein applying the adjusted transformation comprises translation snapping to the predetermined translation.

5. The media of claim 1, wherein determining that the first transformation is to be adjusted comprises:
identifying a second transformation between two of the previously existing resolved paths within the electronic drawing; and
determining that the first transformation falls within a threshold of the second transformation; and
wherein applying the adjusted transformation comprises step-transform snapping the resolved path based on the second transformation.

6. The media of claim 1, wherein determining that the first transformation is to be adjusted comprises:
identifying an existing axis of reflection and associated line segments within the electronic drawing; and
determining that the transformed resolved path falls within a threshold of a reflection of one of the line segments about the existing axis of reflection; and
wherein applying the adjusted transformation comprises reflection-axis snapping the resolved path to reflect across the existing axis of reflection.

7. The media of claim 1, wherein determining a measure of similarity between the transformed resolved path and the freeform path comprises evaluating similarity using a Frechet distance.

8. A computerized method for controlling beautification of a freeform path added to an electronic drawing subsequent to previously existing resolved paths in the electronic drawing, the freeform path having at least one curved element, the method comprising:
  classifying a resolved path of the previously existing resolved paths in the electronic drawing as being a same shape as the freeform path by:
    identifying a transformation that aligns the resolved path with the freeform path;
    applying the transformation to the resolved path to generate a transformed resolved path; and
    determining that the transformed resolved path is the same shape as the freeform path;
  based on the determining that the transformed resolved path is the same shape as the freeform path, generating a first path suggestion comprising the transformed resolved path;
  using the transformed resolved path to generate a second path suggestion using an adjusted transformation of the resolved path; and
  providing the second path suggestion to facilitate an adjustment to the freeform path to match the second path suggestion.

9. The method of claim 8, further comprising:
  identifying at least one of a rotation component, a scale component, or a translation component associated with the transformed resolved path;
  determining a component adjustment to the at least one of the rotation component, scale component, or translation component to optimize the transformed resolved path; and
  generating the adjusted transformation by applying the component adjustment to the transformation.

10. The method of claim 9, wherein determining a component adjustment is based on a comparison of the at least one of the rotation component, scale component, or translation component to a predetermined set of values.

11. The method of claim 9, wherein determining a component adjustment is based on a comparison of the at least one of the rotation component, scale component, or translation component to a value that matches a rotation component, scale component, or translation component between two resolved instances of the freeform path.

12. The method of claim 8, wherein using the transformed resolved path to generate a second path suggestion comprises a determination that a rotation component of the transformation falls within a threshold of a predetermined rotational value, the method further comprising generating the adjusted transformation by rotation snapping to the predetermined rotational value.

13. The method of claim 8, wherein using the transformed resolved path to generate a second path suggestion comprises a determination that a scale component of the first transformation falls within a threshold of a predetermined scale; the method further comprising generating the adjusted transformation by scale snapping to the predetermined scale.

14. The method of claim 8, wherein using the transformed resolved path to generate a second path suggestion comprises a determination that a component of the first transformation falls within a threshold of a predetermined translation; the method further comprising generating the adjusted transformation by translation snapping to the predetermined translation.

15. The method of claim 8, wherein using the transformed resolved path to generate a second path suggestion comprises:
  identifying a second transformation between two of the previously existing resolved paths within the electronic drawing; and
  determining that the transformation falls within a threshold of the second transformation,
  the method further comprising generating the adjusted transformation by step-transform snapping the resolved path based on the second transformation.

16. The method of claim 8, wherein using the transformed resolved path to generate a second path suggestion comprises:
  identifying an existing axis of reflection and associated line segments within the electronic drawing; and
  determining that the transformed resolved path falls within a threshold of a reflection of one of the line segments about the existing axis of reflection,
  the method further comprising generating the adjusted transformation by reflection-axis snapping the resolved path to reflect across the existing axis of reflection.

17. The method of claim 8, wherein determining that the transformed resolved path is the same shape as the freeform path comprises evaluating similarity using a Frechet distance.

18. A computer system comprising:
  one or more hardware processors and memory configured to provide computer program instructions to the one or more hardware processors;
  a freeform drawing component configured to utilize the one or more hardware processors to receive a freeform path added to an electronic drawing subsequent to previously existing resolved paths in the electronic drawing, the freeform path including at least one curved element;
  a means for generating, utilizing the one or more hardware processors, an adjusted transformation adjusting a first transformation to optimize a transformed resolved path based on classifying a resolved path of the previously existing resolved paths as being a same shape as the freeform path by: (i) identifying the first transformation aligning the resolved path with the freeform path, (ii) applying the first transformation to the resolved path to generate the transformed resolved path, (iii) determining a measure of similarity between the transformed resolved path and the freeform path, and (iv) determining, based on the measure of similarity, that the transformed resolved path is the same shape as the freeform path; and
  a path provider configured to utilize the one or more hardware processors to present a path suggestion to adjust the freeform path, the path suggestion being based on the adjusted transformation to the resolved path.

19. The computer system of claim 18, wherein the means for generating is configured to utilize the one or more hardware processors to:
  identify at least one of a rotation component, a scale component, or a translation component associated with the transformed resolved path;
  determine a component adjustment to the at least one of the rotation component, scale component, or translation component to optimize the transformed resolved path; and
  generate the adjusted transformation by applying the component adjustment to the first transformation.

20. The computer system of claim 19, wherein the means for generating is configured to utilize the one or more hardware processors to determine the component adjustment based on a comparison of the at least one of the rotation component, scale component, or translation component to a predetermined set of values.

\* \* \* \* \*